(12) United States Patent
Kato

(10) Patent No.: US 7,634,418 B2
(45) Date of Patent: *Dec. 15, 2009

(54) FACILITY USAGE INFORMATION PROCESSING APPARATUS AND RELATED METHOD USING TICKETS HAVING UNIQUE INFORMATION TO MANAGE CONGESTION STATUS OF VISITORS

(75) Inventor: Mitsugu Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 736 days.

This patent is subject to a terminal disclaimer.

(21) Appl. No.: 11/088,925

(22) Filed: Mar. 25, 2005

(65) Prior Publication Data
US 2006/0143036 A1    Jun. 29, 2006

(30) Foreign Application Priority Data
Dec. 28, 2004   (JP)  ............................. 2004-381893

(51) Int. Cl.
*H04B 7/00* (2006.01)
*A63J 3/00* (2006.01)
*G06F 17/60* (2006.01)

(52) U.S. Cl. ............................ 705/1; 472/92; 472/136; 705/5; 434/365; 370/388; 370/310; 382/100; 702/150

(58) Field of Classification Search ................... None
See application file for complete search history.

(56) References Cited

U.S. PATENT DOCUMENTS

| 5,929,848 | A * | 7/1999 | Albukerk et al. ............. 715/700 |
| 6,466,975 | B1 * | 10/2002 | Sterling ....................... 709/223 |
| 6,889,098 | B1 * | 5/2005 | Laval et al. .................... 700/19 |
| 7,137,899 | B2 * | 11/2006 | Hiei .............................. 472/92 |
| 2002/0068991 | A1 * | 6/2002 | Fitzsimmons, Jr. ........... 700/214 |
| 2002/0168084 | A1 * | 11/2002 | Trajkovic et al. ............ 382/100 |
| 2002/0174003 | A1 * | 11/2002 | Redmann et al. ............... 705/8 |
| 2003/0114233 | A1 * | 6/2003 | Hiei ............................ 472/92 |
| 2004/0022227 | A1 * | 2/2004 | Lynch et al. ................. 370/338 |
| 2005/0066358 | A1 * | 3/2005 | Anderson et al. ............. 725/39 |

FOREIGN PATENT DOCUMENTS

| JP | 10-301984 | 11/1998 |
| JP | 2001-317958 | 11/2001 |
| JP | 2002-056366 | 2/2002 |
| JP | 2004-094430 | 3/2004 |
| JP | 2004-094431 | 3/2004 |
| JP | 2004-094891 | 3/2004 |

* cited by examiner

*Primary Examiner*—John G. Weiss
*Assistant Examiner*—Matthew L. Brooks
(74) *Attorney, Agent, or Firm*—Fujitsu Patent Center

(57) ABSTRACT

Usage status in a facility is comprehended so that service information such as user waiting times is quickly offered to users and others. This is configured to comprise detection units (antennas) detecting unique information of tickets carried by visitors in areas for keeping the visitors waiting, and a calculation unit (control PC, information management center) calculating visitor information representative of congestion status of the visitors in the areas.

7 Claims, 21 Drawing Sheets

FIG.8

WAITING-TIME MANAGEMENT TABLE (91) OF BASIC INFORMATION DB (28)

| TYPE OF ATTRACTION | ENTRY UNIT | WAITING TIME |
|---|---|---|
| ROLLER COASTER | 50 | 10 MINUTES |
|  |  |  |
|  |  |  |

FIG.9

WAITING-TIME TABLE (93) OF WAITING-TIME DB (30)

| TYPE OF ATTRACTION | NUMBER OF DETECTED TAGS | WAITING TIME |
|---|---|---|
| ROLLER COASTER | 500 | 100 MINUTES |
|  |  |  |
|  |  |  |

FIG.11

WAITING TIME LIST
----- AS OF 10:00 -----

10:00  CURRENT WAITING TIME FOR "THE ROLLER COASTER" IS 80 MINUTES

10:00  CURRENT WAITING TIME FOR "THE COFFEE CUP" IS 20 MINUTES

10:00  CURRENT WAITING TIME FOR "THE FERRIS WHEEL" IS 45 MINUTES

10:00  CURRENT WAITING TIME FOR "THE HAUNTED HOUSE" IS 30 MINUTES

FIG.15

MAIL INFORMATION TABLE (130) OF PERSONAL INFORMATION DB (96)

(A)

| IC TAG IDENTIFICATION DATA (UID) | MAIL ADDRESS | |
|---|---|---|
| E04C2280 | suzuki@mail.sav | |
| E04C2540 | tanaka@mail.sav | |
| XXXXXXX | XXXXXXXXXX | |

ACCEPTABLE WAITING-TIME INFORMATION TABLE (132) OF PERSONAL INFORMATION DB (96)

(B)

| IC TAG IDENTIFICATION DATA (UID) | ACCEPTABLE WAITING TIME | TYPE OF ATTRACTION |
|---|---|---|
| E04C2280 | 60 MINUTES | ROLLER COASTER |
| E04C2280 | 30 MINUTES | MERRY-GO-ROUND |
| XXXXXXX | XXX | XXXXXXXXXX |

WAITING TIME LIST — 114
---- AS OF 10:00 ----
ROLLER COASTER 80 MINUTES
COFFEE CUP 20 MINUTES
HAUNTED HOUSE 30 MINUTES
FERRIS WHEEL 45 MINUTES
................ ............
................ ............ — 136
REFINEMENT CONDITION
☐WAITING TIME WITHIN 30 MINUTES — 138
☐WITHIN ○○m FROM PRESENT LOCATION
☐GRADE-SCHOOLERS AND YOUNGER CHILDREN CAN RIDE
☐FREE KEYWORD
SEARCH

⇩ SELECTING "WAITING TIME WITHIN 30 MINUTES"

(B)

WAITING TIME LIST
---- AS OF 10:00 ----
114
☐WAITING TIME WITHIN 30 MINUTES

COFFEE CUP 20 MINUTES
HAUNTED HOUSE 30 MINUTES — 136
............... ............
............... ............

US 7,634,418 B2

FACILITY USAGE INFORMATION PROCESSING APPARATUS AND RELATED METHOD USING TICKETS HAVING UNIQUE INFORMATION TO MANAGE CONGESTION STATUS OF VISITORS

BACKGROUND OF THE INVENTION

1. Field of the Invention

The present invention relates to information processing for usage information of visitors to various facilities such as amusement facilities and, for example, to a facility usage information processing apparatus, method for information processing thereof and portable terminal apparatus for offering usage information such as a congestion status for each attraction of a facility to facility users and the like.

2. Description of the Related Art

Conventionally, with regard to management of facility usage information, arrangements are known for obtaining information of behavior in an event site, such as current positions, visiting locations and staying time of visitors of the event site (e.g., Japanese Patent Application Laid-Open Publication No. 2001-317958), for identifying visitors to a facility such as a sports stadium with the use of IC tags to perform a delivery service of various pieces of information to the visitors with the use of cellular phones (e.g., Japanese Patent Application Laid-Open Publication No. 2004-94431), for recognizing users every time the users pass through a facility in an amusement park and the like to manage users of the facility (e.g., Japanese Patent Application Laid-Open Publication No. 1998-301984), and others.

By the way, in various facilities such as amusement facilities, even if visitors are dispersed to a large number of attractions, considerable congestion is expected, and as a waiting time becomes longer, visitors feel annoyed and exhausted. Although a certain level of effectiveness can be expected from crowd control on the premises by administrators, human management has limitations. A visitor in a waiting area of a certain attraction cannot know exact waiting times of distant attractions. Also, a congestion status in a facility cannot be known from outside of the facility.

SUMMARY OF THE INVENTION

It is therefore the object of the present invention to comprehend usage status in a facility and to quickly offer service information, such as waiting times of users, to the users and others.

In order to achieve the above object, according to an aspect of the present invention there is provided a facility usage information processing apparatus, comprising a detection unit detecting unique information of tickets carried by visitors in an area for keeping the visitors waiting; and a calculation unit calculating visitor information representative of a congestion status of the visitors in the area with the use of the detected information of the detection unit.

According to this configuration, unique information is detected from the ticket carried by the visitor in the area such as the waiting place for the visitors of the facility and, by calculating the number of the visitors and waiting times thereof based on the detected information, the congestion status is comprehended for the visitors in the area. The waiting time is a time period between when a visitor arrives at the end of the waiting line and when the visitor moves to the front of the line, i.e., the time required for entering into an attraction facility out of the above mentioned area.

To attain the above object, in the facility usage information processing apparatus of the present invention, the visitor information may be configured to contain information representative of the number of visitors and/or a waiting time in the area, and the detection unit may be configured to detect unique information of the tickets for each of a plurality of detection ranges set by partitioning the area and to obtain position information within the detection ranges along with the detected information.

To attain the above object, the facility usage information processing apparatus of the present invention may further comprise a first information accumulation unit accumulating the detected information of the detection unit; and a second information accumulation unit accumulating the visitor information acquired by the calculation unit. According to this configuration, the detected information is stored in the first information accumulation unit, and the visitor information, i.e., calculation results of the detected information, is stored in the second information accumulation unit and used for display and retrieval.

To attain the above object, the facility usage information processing apparatus of the present invention may further comprise a display device displaying information, wherein the visitor information is displayed on the display device. According to this configuration, the visitor information is displayed on the display unit; the visitors and others are notified of the congestion status of the visitors; and the visitors can be guided based on the information.

To attain the above object, the facility usage information processing apparatus of the present invention may further comprise a third information accumulation unit accumulating personal information; and an information notification unit notifying of the visitor information of the second information accumulation unit, wherein a terminal apparatus conforming to the personal information stored in the third information accumulation is notified of the visitor information based on a request from the terminal apparatus.

To attain the above object, in the facility usage information processing apparatus of the present invention, the information notification unit may be configured to publish the visitor information to a web site on network for enabling a terminal apparatus to extract the visitor information from the web site.

In order to achieve the above object, according to another aspect of the present invention there is provided an information processing method of a facility usage information processing apparatus, the method comprising the steps of partitioning the area by reception ranges of the radio signals transmitted from tickets carried by visitors in an area for keeping the visitors waiting and receiving the radio signals within the partitions; detecting unique information from the radio signals; and calculating visitor information with the use of detected unique information.

In order to achieve the above object, according to still another aspect of the present invention there is provided a portable terminal apparatus connected to a network on which a web site publishes visitor information of a facility, the portable terminal apparatus comprising an input unit specifying the web site on the network; a control unit importing the visitor information offered by the web site specified by the input unit; and a display unit displaying the visitor information. By virtue of this configuration, the visitor information published on the web site on the network can be easily known from the portable terminal apparatus.

As set forth hereinabove, the present invention relates to the information processing for usage information of the visitors to various facilities such as amusement facilities and is useful because of being able to check the congestion status within the facility in real time, able to guide the user depending on the acceptability of the congestion and able to improve the facility utilization rate, for example.

Features and advantages of the present invention are listed as follows.

(1) Congestion status within a facility can be checked in real time with the use of unique information of tickets.

(2) The facility can be utilized by users depending on acceptability of the congestion.

(3) The users can be guided depending on the utilization of the facility to improve the facility utilization rate.

(4) Visitor information representing the congestion status can be used for managing position information of the users.

Other objects, features and advantages of the present invention will become more apparent with reference to the accompanying drawings and the embodiments.

BRIEF DESCRIPTION OF THE DRAWINGS

FIG. 8 shows a waiting-time management table of a basic information DB;

FIG. 9 shows a waiting-time table of a waiting-time DB;

FIG. 11 shows an example of display;

FIGS. 15(A) and 15(B) show registration information of an acceptable waiting-time information table;

FIGS. 21(A) and 21(B) show display screens on a display unit of a cellular phone apparatus.

DETAILED DESCRIPTION OF THE PREFERRED EMBODIMENTS

First Embodiment

Figure 1:
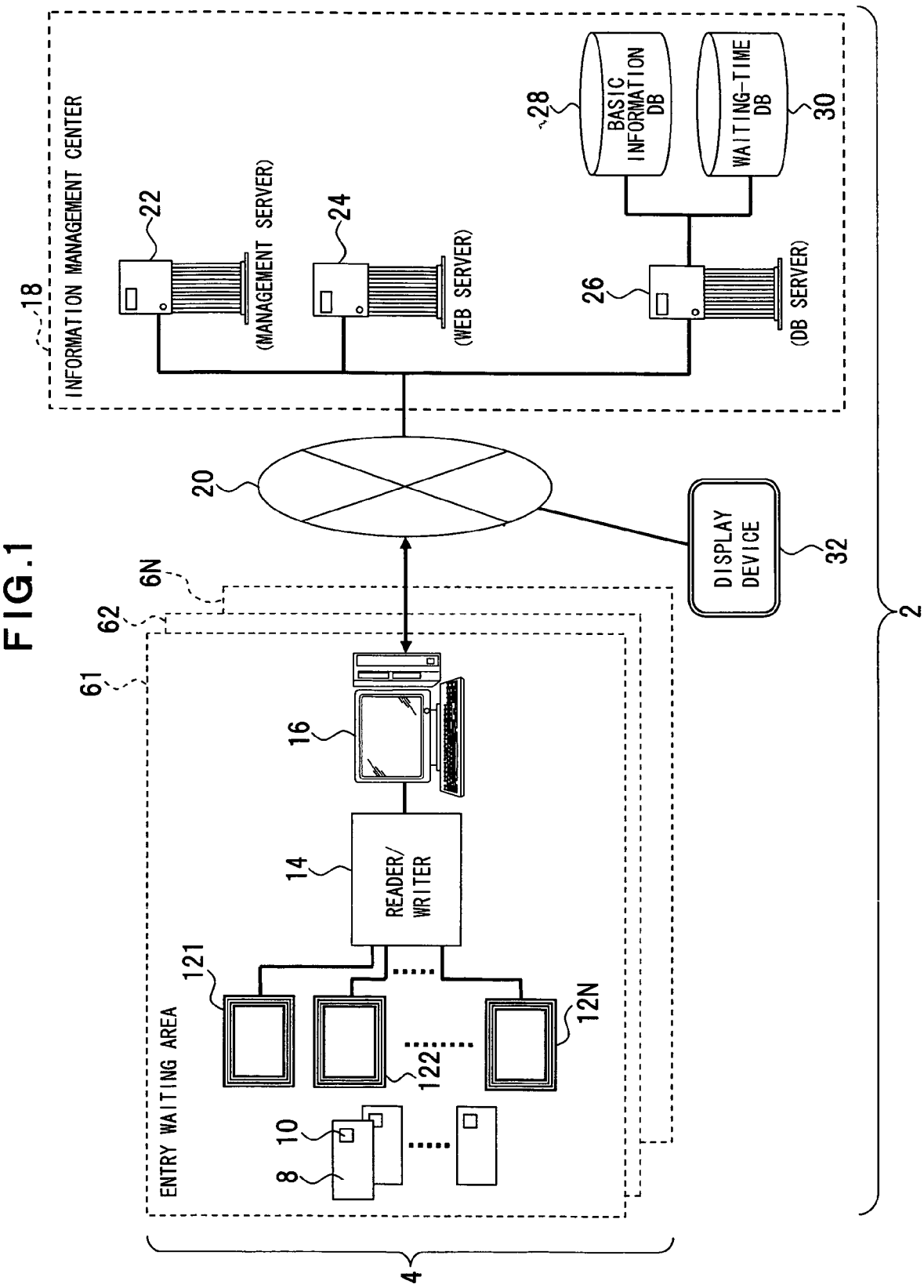
FIG. 1 is a block diagram of a facility usage information processing apparatus according to a first embodiment of the present invention.

A first embodiment of the present invention is described with reference to FIG. 1. FIG. 1 is a block diagram of a facility usage information processing apparatus.

This facility usage information processing apparatus 2 is disposed in a facility 4 such as an amusement facility, imports usage information of visitors, i.e. facility users, from the facility 4 in real time and offers various pieces of information such as a waiting time for an attraction to the visitors and others. A range of people receiving the offering of the various pieces of information such as a waiting time includes the visitors as well as administrators and individuals outside the facility, for example, individuals intending to enter the facility, and is not limited to the visitors. In the facility 4, for example, an amusement facility, a plurality of attractions is disposed and the users wait for each attraction. Therefore, in the facility 4, a plurality of entry waiting areas 61, 62, . . . , 6N are formed by, for example, making waiting lines of the visitors for waiting for each attraction. These entry waiting areas 61, 62, . . . , 6N correspond to the attractions.

When the visitors enter the facility 4, entry tickets 8 are distributed as tickets for using the facility, and each entry ticket 8 is provided with unique information (UID: Unique Identifier) as an IC tag identification data. Hereinafter, the IC tag identification data or the unique information is simply referred to as "UID". In this embodiment, an IC (Integrated Circuit) tag 10 is attached for transmitting a radio signal which is an electromagnetic wave, as a signal transmission unit transmitting a radio signal having the unique information. By receiving the radio unique information emitted from the IC tag 10, the above mentioned UID can be known from the radio unique information.

Each entry waiting area 61 to 6N is provided with a reader/writer 14 with a plurality of antennas 121, 122, . . . , 12N as a detection unit of the radio unique information. Each antenna 121 to 12N is disposed at a position corresponding to the waiting line of the visitors. Each antenna 121 to 12N has a separate reception range and, if the IC tag 10 enters into the reception range, the IC tag 10 will be received by any antenna 121 to 12N within the reception range of the electromagnetic wave. The received signal of each antenna 121 to 12N is detected by the reader/writer 14 to regenerate the UID. The UID is imported to a control personal computer (PC) 16 that is an information calculation unit or a first information processing device. The control PC 16 is responsible for processing such as importing the UID and transmitting the UID to an information management center 18. The information management center 18 constitutes an information processing unit or a second information processing device. Although, in this embodiment, the control PC 16 is individually disposed in each entry waiting area 61 to 6N, a configuration may be constructed such that the control PC 16 is independent from each entry waiting area 61 to 6N and imports the UIDs from each entry waiting area 61 to 6N.

Figure 4:
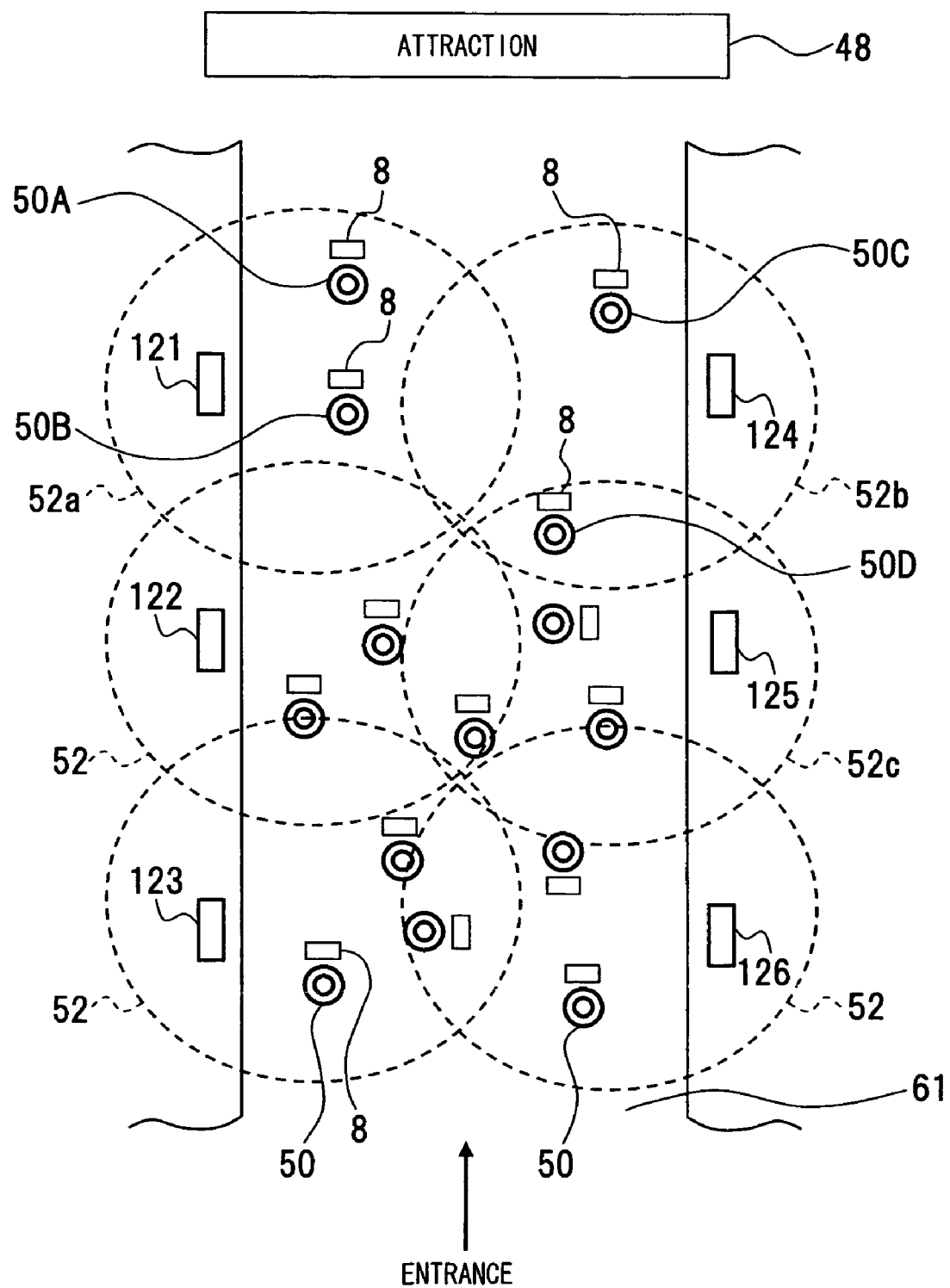
FIG. 4 shows antennas and others disposed in an entry waiting area of an attraction.

The control PC 16 is connected with, for example, the information management center 18, which acts as an information calculation unit, information accumulation unit or information notification unit via network 20 such as the internet, and the detected UIDs are sequentially transmitted and imported to the information management center 18. The information management center 18 is provided with a management server 22, a web server 24 and a database (DB) server 26 which act as an information processing unit and, on the DB server 26, for example, a basic information database (DB) 28 is formed as a first information accumulation unit storing various pieces of information such as UID and, for example, a waiting time database (DB) 30 is formed as a second information accumulation unit. The management server 22 is responsible for the import of information from the control PC 16, the storage processing of the information and the control of display output processing and the like. The web server 24 establishes a web site on the network 20 and manages the web site, for example. The DB server 26 stores basic information required for the calculation, such as the above mentioned UID, position information of attractions in the facility, position information of the antennas 121 to 12N and position information of the visitors. The basic information DB 28 stores basic information, for example, known information such as positions of the antennas 121 to 12N, the areas 61 to 6N and an attraction 48 (FIG. 4). The waiting time DB 30 calculates waiting times of the visitors using the above mentioned basic information and stores the waiting-time information. The waiting time is, for example, a predicted time period for an attraction between when a visitor arrives at the end of the waiting line formed by visitors and when the visitor moves to the front of the line and enters the attraction facility and, in other words, a predicted time period between when a visitor enters into the entry waiting areas 61 to 6N and when the visitor exits from the entry waiting areas 61 to 6N.

Also, this facility usage information processing apparatus 2 is provided with a display device 32 displaying various pieces of information such as the waiting-time information transmitted from the information management center 18, and the display device 32 is, for example, a guidance display board provided with a personal computer and the like for presenting information for visitors and is connected to the information management center 18 via the network 20.

Figure 2:
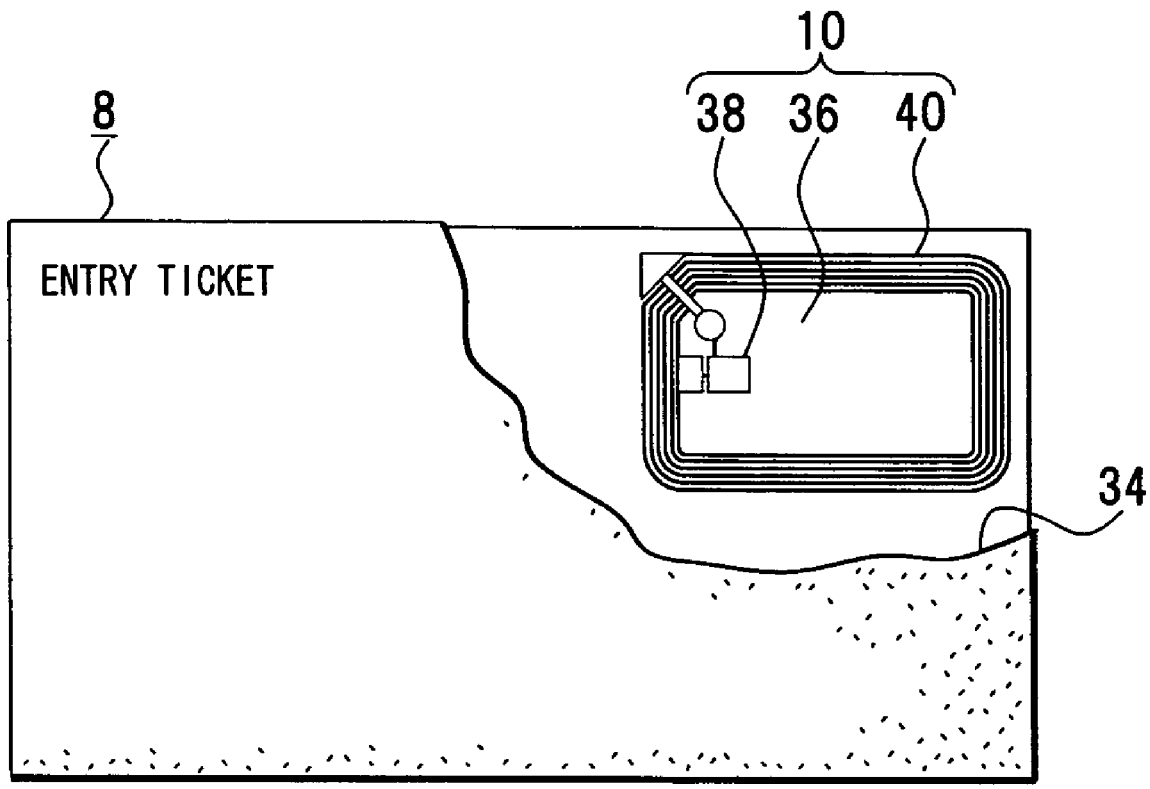
FIG. 2 shows an entry ticket with a cut-away portion.
Figure 3:
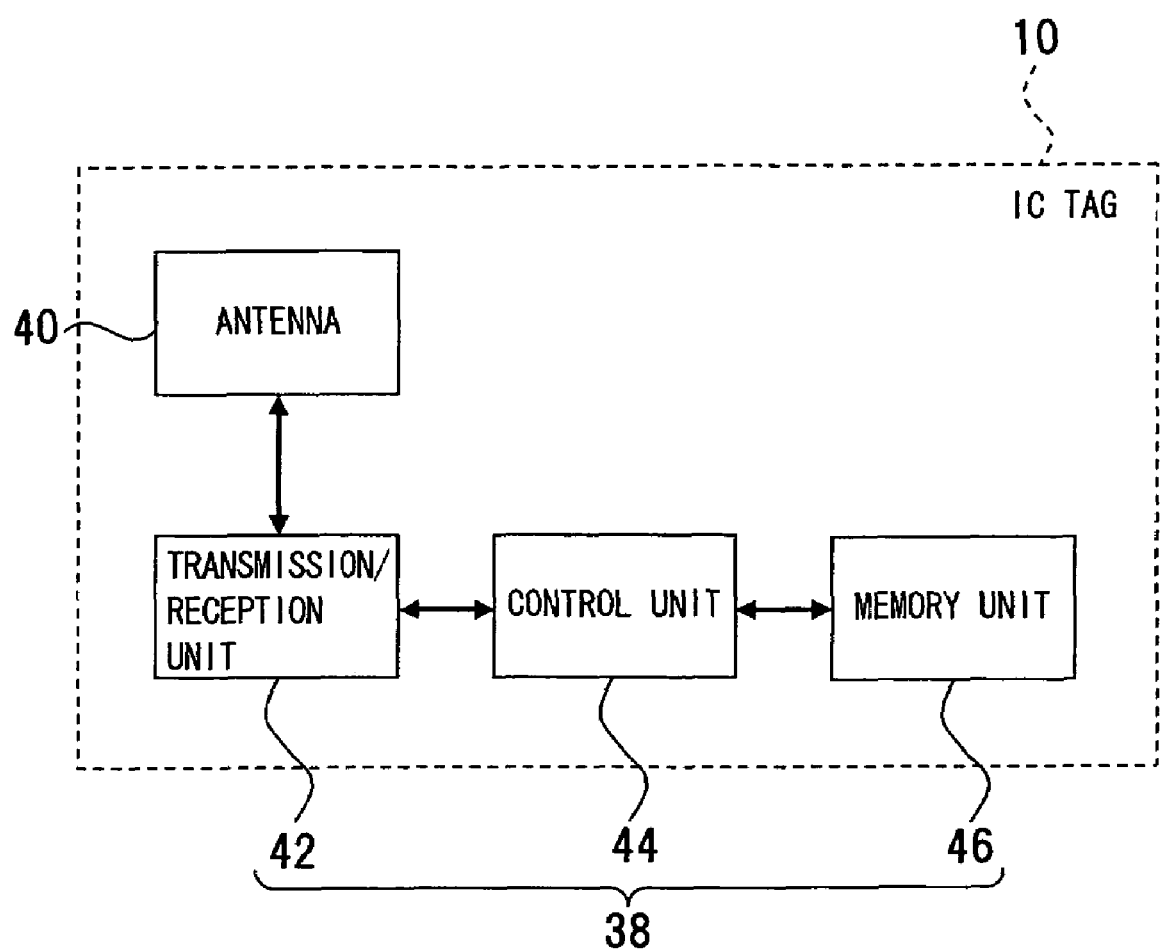
FIG. 3 is a block diagram of a configuration of an IC tag.

The entry ticket and the IC tag are then described with reference to FIG. 2 and FIG. 3. FIG. 2 shows the entry ticket with a cut-away portion and FIG. 3 is a block diagram of a configuration of the IC tag.

The entry ticket 8 is made of a slip of paper or a slip of synthetic resin. In the entry-ticket 8, the IC tag 10 is embedded, and 34 represents a covering portion thereof. The IC tag 10 is provided with an IC chip 38 and a coil antenna 40 on a substrate 36.

The IC chip 38 of the IC tag 10 is provided with a transmission/reception unit 42, a control unit 44 and a memory unit 46, and the transmission/reception unit 42 transmits and receives a radio signal with a certain frequency via the antenna 40 as well as modulates an electric signal representing the UID read out from the memory unit 46 to form the radio unique information which is a high-frequency signal. As a result, the radio unique information is transmitted via the antenna 40 as an electromagnetic wave with the certain frequency, and the radio unique information can also be received. The control unit 44 controls the transmission and reception of the transmission/reception unit 42 and stores and reads out the UID and the like into and from the memory unit 46. The memory unit 46 stores the unique information and the like and programs. In this case, on the memory unit 46 of the IC tag 10 attached to the entry ticket 8, different UID is written for each entry ticket 8 with the use of the reader/writer 14, for example.

Therefore, by receiving the radio unique information transmitted by the IC tag 10 of the entry ticket 8, the UID can be checked from the radio unique information, and the presence of the entry ticket 8 can be identified. From position information of the UID and the antenna 40, positions and density (congestion) of the visitors can be known.

Then, the relationship between the antenna on the reader/writer side and the entry waiting area is described with reference to FIG. 4. FIG. 4 shows antennas and others disposed in an entry waiting area of an attraction.

In the facility 4, for example, the attraction 48 is disposed and, at an entrance portion thereof, for example, the entry waiting area 61 is defined for visitors 50 waiting for the attraction. In the entry waiting area 61, a large number of visitors 50 form a waiting line and each visitor 50 has the above mentioned entry ticket 8. Each entry ticket emits the above mentioned radio unique information. The antennas 121, 122, 123, 124, 125 and 126 are disposed such that the antennas sandwich the entry waiting area 61 and are spaced at predetermined intervals in the direction of the waiting line. Each antenna 121 to 126 has a receivable range 52 for the radio unique information. In this embodiment, in order to avoid generating a blind zone, each antenna 121 to 126 is disposed such that each receivable range 52 has overlapped portion.

By making this configuration, since only the antenna 121 receives the radio unique information emitted from the entry tickets of the visitors 50A and 50B existing within the receivable range 52*a* of the antenna 121, it is known that the visitors 50A and 50B exist within the receivable range 52*a* of the antenna 121. Also, the positions are determined from the receiving antenna 121. Although the antenna 124 detects the visitors 50C and 50D existing within the receivable range 52*b* of the antenna 124, the visitor 50D is also detected by the antenna 125. For the visitor 50C detected only by the antenna 124, the position is determined from the receiving antenna 124. From the perspective of the detected information, the numbers of the visitors 50 are the same between the receivable range 52*a* of the antenna 121 and the receivable range 52*b* of the antenna 124, and it is known that the same congestion status exists. Magnitude of the number of the visitors 50 can be known from UIDs detected from the different radio frequency information.

In this case, the visitor 50D exists within the overlapping range between the receivable range 52*b* of the antenna 124 and the receivable range 52*c* of the antenna 125, and since the both antennas 124 and 125 receive the radio unique information emitted from the entry ticket 8 carried by the visitor 50D, the position thereof will be determined from the both antennas 124 and 125.

After detecting all the visitors 50 forming the waiting line in the entry waiting area 61, the length of the waiting line is determined from the detected information, and the waiting time can be calculated.

Figure 5:
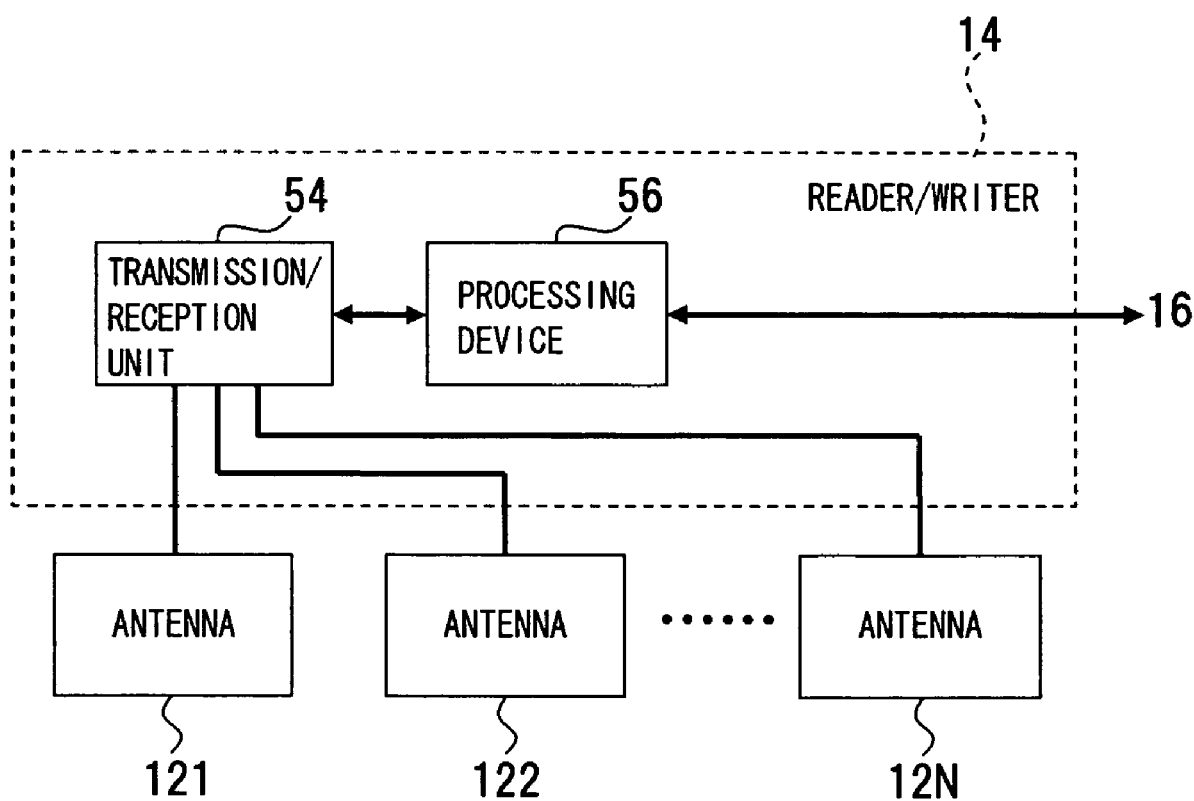
FIG. 5 is a block diagram of an example of a configuration of a reader/writer.

Then, the reader/writer is described with reference to FIG. 5. FIG. 5 is a block diagram of an example of a configuration of the reader/writer.

The reader/writer 14 is provided with a transmission/reception unit 54 and a processing device 56, and the transmission/reception unit 54 is connected with the above mentioned plural antennas 121 to 12N. The transmission/reception unit 54 transmits or receives the above mentioned radio unique information, and the processing device 56 performs detection processing for the above mentioned UID from the radio unique information which is the received signal or performs processing for converting the UID to the radio unique information. The UID is written into the IC tag 10 of the entry ticket 8 before distribution to the visitors, through the reader/writer 14 under the control of the control PC 16. After the radio unique information received by the antennas 121 to 12N is detected by the transmission/reception unit 54, the UID is detected by the processing unit 56, and the detected information is added to the control PC 16.

Figure 6:
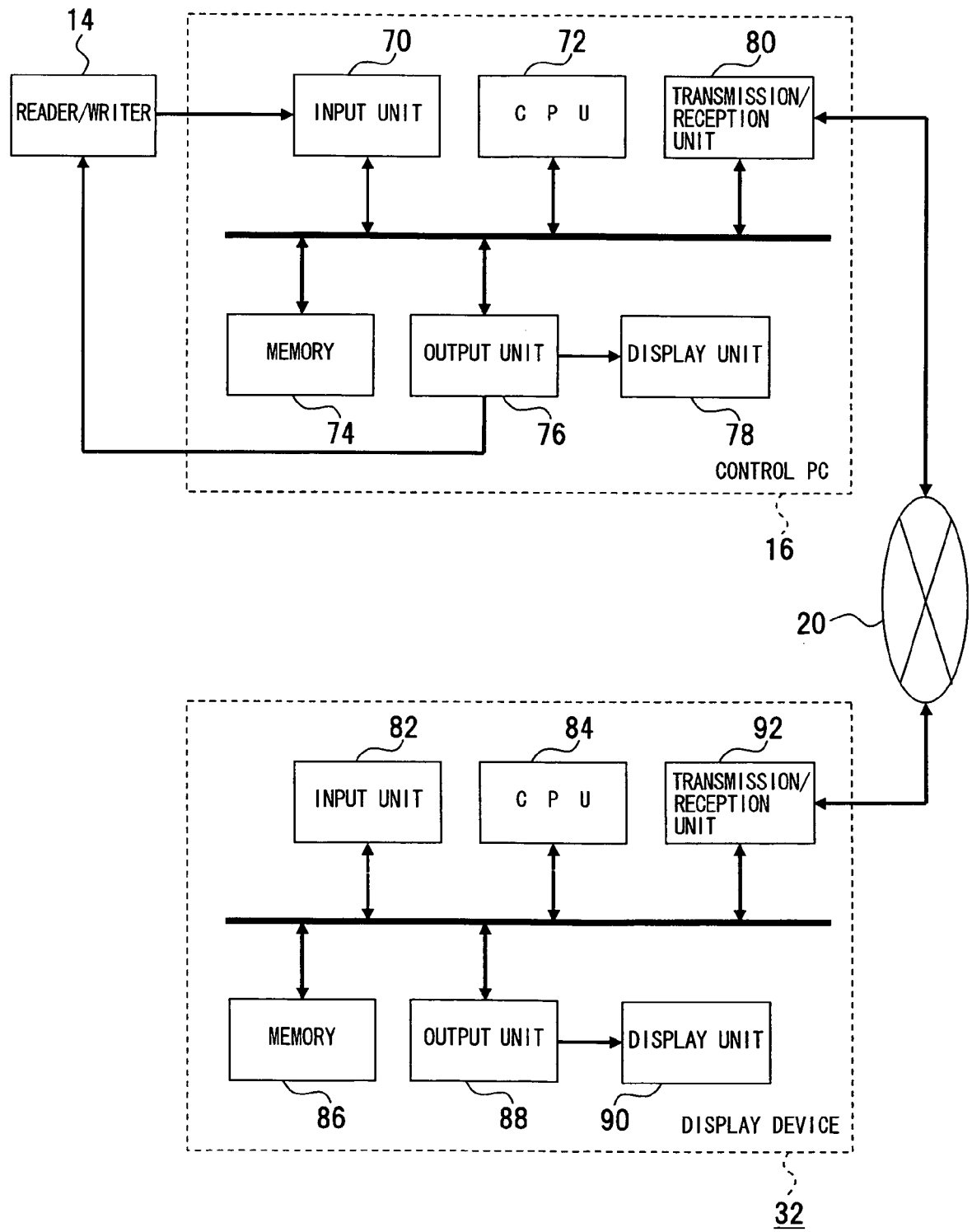
FIG. 6 is a block diagram of an example of a control PC and a display device.

Then, the control PC and the display device are described with reference to FIG. 6. FIG. 6 is a block diagram of an example of the control PC and the display device.

The control PC is provided with an input unit 70, a CPU (Central Processing Unit) 72, a memory 74, an output unit 76, a display unit 78, a transmission/reception unit 80 and others. The input unit 70 is connected with the reader/writer 14 and information input equipments such as a keyboard for inputting various pieces of information such as the UIDs. The CPU 72 executes programs stored in the memory 74 to perform calculation of various pieces of information and various types of processing. The memory 74 stores various programs for the UID import processing and the like and various data. The output unit 76 issues the UIDs to be written into the IC tag 10 of the entry ticket 8 to the calculation results of the CPU 72 and the reader/writer 14, as well as outputs display outputs corresponding to display information to the display unit 78 under the control of the CPU 72. The display unit 78 displays various data and input information, such as the imported UIDs. The transmission/reception unit 80 is also responsible for receiving instruction information from the information management center 18 and for sending necessary information, and transmits the UIDs detected from the above mentioned radio unique information to the information management center 18 (FIG. 1) via the network 20, after encrypting the UIDs, for example.

The display device 32 consists of, for example, a PC similar to the control PC 16 and is comprised of an input unit 82, a CPU 84, a memory 86, an output unit 88, a display unit 90, a transmission/reception unit 92 and others. The input unit 82 connected with information input equipments such as a keyboard for inputting various pieces of information. The CPU 84 performs information transmission/reception processing and executes a display program stored in the memory 86 to perform calculation of various pieces of information and various types of display processing. The memory 86 stores the display program and the display information transmitted from the information management center 18 via the network 20. The output unit 88 outputs display outputs corresponding to the display information to the display unit 90 under the control of the CPU 84. The display unit 90 consists of an LCD (Liquid Crystal Display), an LED (Light Emitting Diode) display or the like and is used for displaying the waiting-time information and others. The transmission/reception unit 92 is provided with the waiting-time information and others as the display information from the information management center 18, and the information is displayed on the display unit 90.

Figure 7:
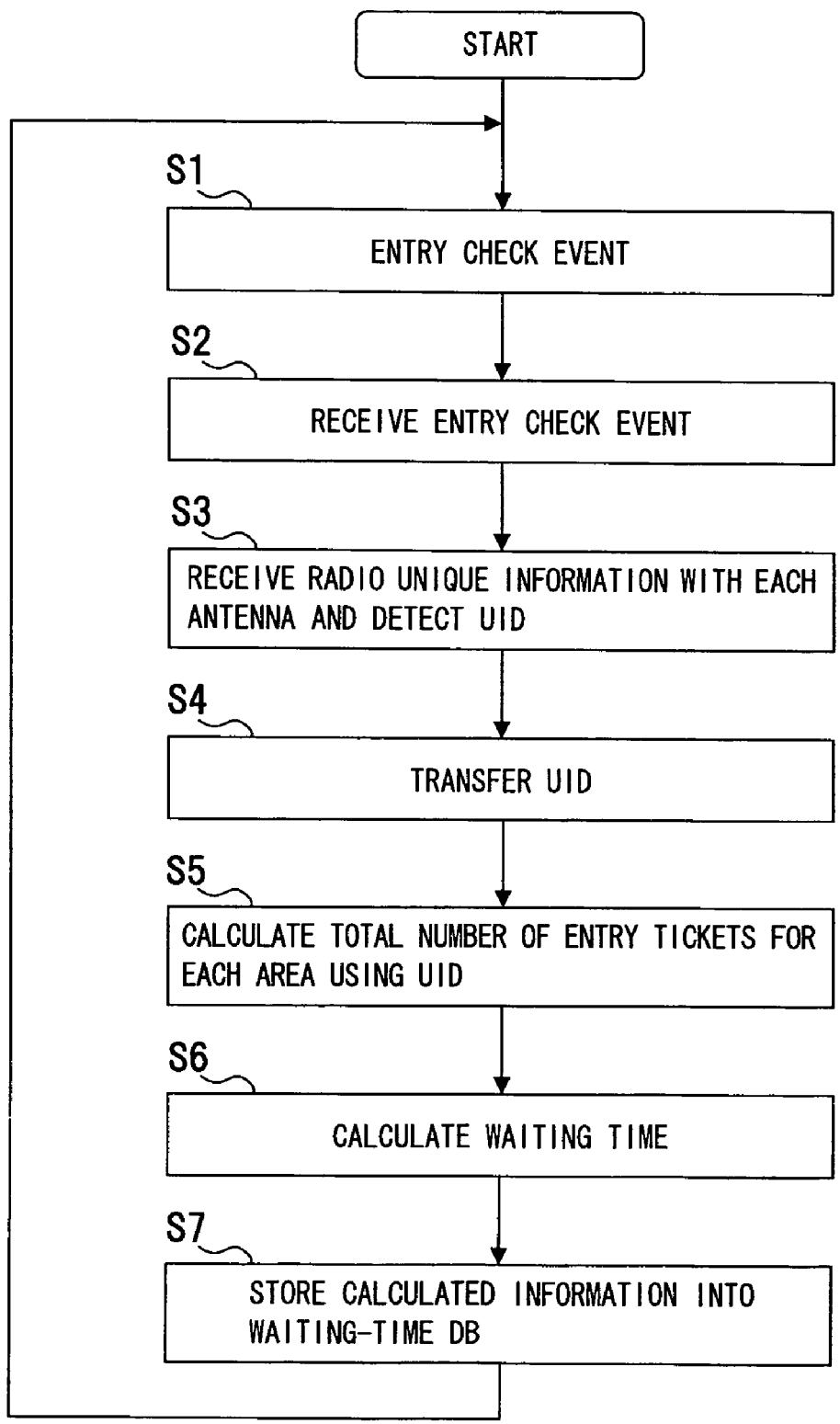
FIG. 7 is a flowchart showing a processing procedure of waiting-time calculation processing.

Then, the waiting-time calculation processing is described with reference to FIG. 7. FIG. 7 is a flowchart showing a processing procedure of the waiting-time calculation processing based on a visitor check.

The control PC 16 generates entry check events at time intervals of the information collection for calculating the waiting time (step S1). When the reader/writer 14 in a standby state receives the entry check event (step S2), the reader/writer 14 makes the transition to a detection state for the unique information and others and receives the radio unique information emitted from the IC tag 10 with each antenna 121 to 12N. The UID is detected as detected information from the radio unique information and is imported to and stored in the memory 74 (step S3). The UID, i.e., the detected information is transferred through the transmission/reception unit 80 to the management server 22 side of the information management center 18 via the network 20 (step S4).

The management server 22 calculates the total number Nm of the entry tickets 8 and, for each entry waiting area 61 to 6.N, calculates the total number Na of the entry tickets 8, using the imported UIDs (step S5). In this case, if the same UIDs exist, the total numbers Nm and Na are calculated after eliminating correspondingly.

Also, the waiting time is calculated for each area 61 to 6N that is set up for each attraction (step S6). Assuming that: Na is the total number of the entry tickets 8 for each area 61 to 6N; n is an entry unit which is the number of the visitors who can enter the attraction in each area 61 to 6N at one time; and tw is the entry unit waiting time for each area 61 to 6N, the waiting time Tw is as follows.

$$Tw = Na \div n \times tw \quad (1)$$

For some attractions, the entry unit n=1, therefore, in this case, the following equation is derived from equation (1).

$$Tw = Na \times tw \quad (2)$$

In this way, the waiting time Tw is calculated for each attraction.

The total numbers Nm, which are the numbers obtained by adding up the detected UIDs, Na and the waiting time Tw are stored in the waiting time DB 30 with area information representing the area 61 to 6N (step S7). These pieces of calculated information may be updated for every entry check event or may be accumulated for every entry check event.

After such a processing, the procedure returns to step Si and waits for generation of the next entry check event. Subsequently, the above mentioned processing will be executed depending on the entry check event.

Then, the information accumulated in the basic information DB is described with reference to FIG. 8. FIG. 8 shows a waiting-time management table of the basic information DB.

In the basic information DB 28, the waiting-time management table 91 is set up for managing the waiting time and, in the waiting-time management table 91, items are set up for a type of the attraction, the above mentioned entry unit (n) and the waiting time (Tw). In the example of FIG. 8, a roller coaster is shown as an example of the attraction; "50" is shown as the entry unit n; and "10 (minuets)" is shown as the waiting time Tw.

In this way, the waiting-time management table 91 of the basic information DB stores the entry unit n and the waiting time Tw associated with the attraction; the type of the attraction can be extracted from the waiting time Tw; the attraction and the waiting time can be extracted from the entry unit n; and a congestion status at each attraction can be calculated from these pieces of information.

Then, the information accumulated in the waiting-time DB is described with reference to FIG. 9. FIG. 9 shows a waiting-time table of the waiting-time DB.

In the waiting-time DB 30, the waiting-time table 93 is set up for indicating, for example, the number of detected tags and the waiting time Tw as the information which is the results of the above mentioned equation (1), and in this waiting-time table 93, items are set up for a type of the attraction, the number of the detected tags and the waiting time (Tw). In the example of FIG. 9, a roller coaster is shown as an example of the attraction; "500" is shown as the number of the detected tags; and "100 (minutes)" is shown as the waiting time Tw.

In this case, since the number of the detected tags is the number of visitors 50 existing in the attraction, for example, within the area 61 (FIG. 4), by using the entry unit n of the attraction, the waiting time Tw is calculated from equation (1), and the result of the calculation is shown as the waiting time Tw=100 (minutes).

Figure 10:
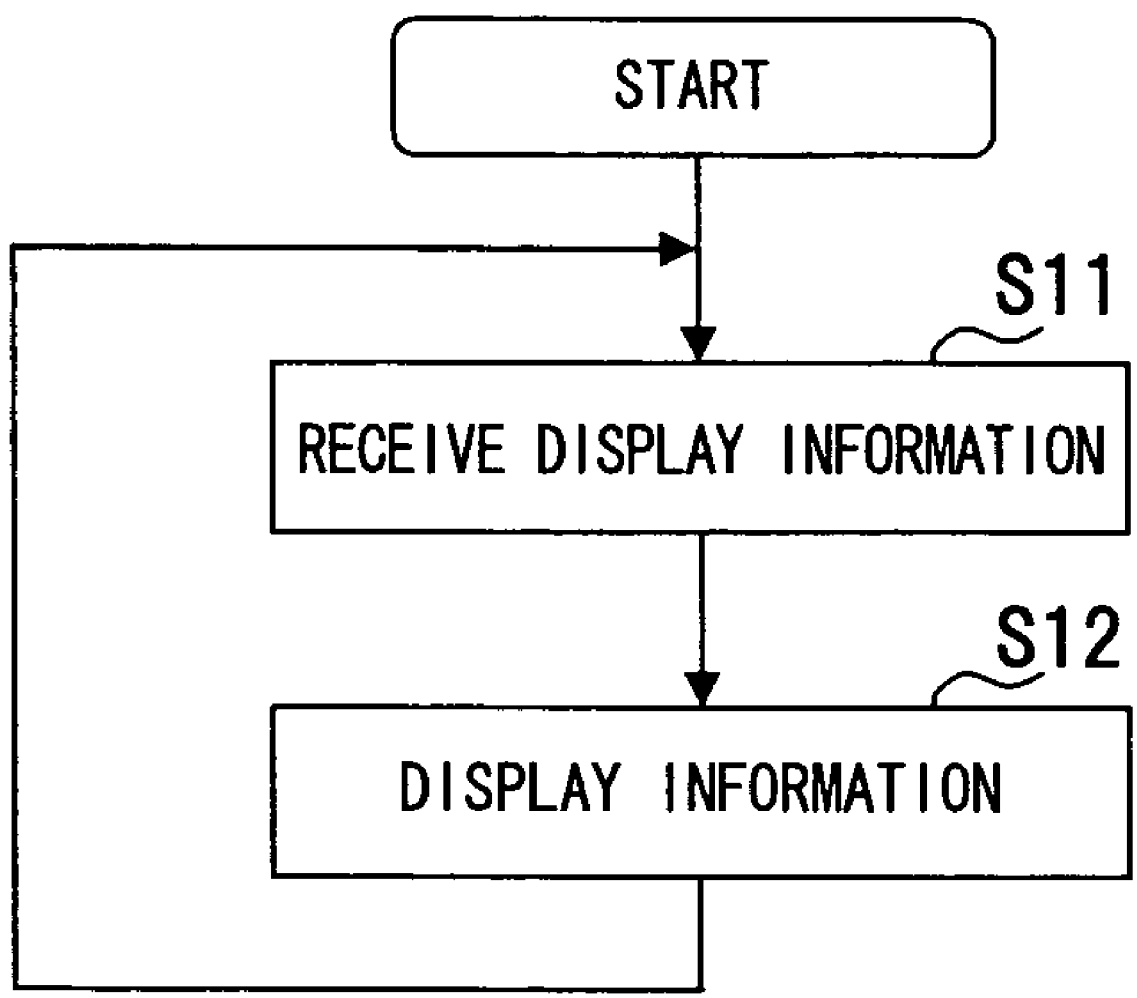
FIG. 10 is a flowchart showing a processing procedure of waiting-time display processing.

Then, the waiting-time display processing is described with reference to FIG. 10 and FIG. 11. FIG. 10 is a flowchart showing a processing procedure of the waiting-time display processing based on the visitor check and FIG. 11 shows an example of the display.

The waiting-time information accumulated in the waiting-time DB 30 (FIG. 1) is transferred to the management server 22 as the display information, received by the display device 32 (FIG. 6) (step S11) and displayed on the display unit 9 (step S12).

The update of the display information may be synchronized with the update of the accumulated information in the waiting-time DB 30 corresponding to the generation of the above described entry check event or may be performed at predetermined time intervals, without synchronized with the entry check event. As a result, the visitors can tell the waiting time Tw for each area 61 to 6N from the display information.

On the display unit 90 (FIG. 6) of the display device 32, for example, as shown in FIG. 11, the waiting time is displayed with a current time and the attraction names corresponding to the area 61 to 61N. In this example, the display is as follows.

[10:00 current waiting time for "the roller coaster" is 80 minutes]

[10:00 current waiting time for "the coffee cup" is 20 minutes]

[10:00 current waiting time for "the Ferris wheel" is 45 minutes]

[10:00 current waiting time for "the haunted house" is 30 minutes]

In this display, "the roller coaster", "the coffee cup", "the Ferris wheel" and "the haunted house" are attraction names and correspond to any of the above mentioned areas 61 to 6N. "10:00" is an example of the time of the display information.

In this way, since the congestion status of the attraction can be found from the visitor information displayed on the display device 32, the visitors can move among attractions depending on the status of the waiting time and can be guided to resolve the congestion, and the usage efficiency of the facility can be improved.

Second Embodiment

Figure 12:
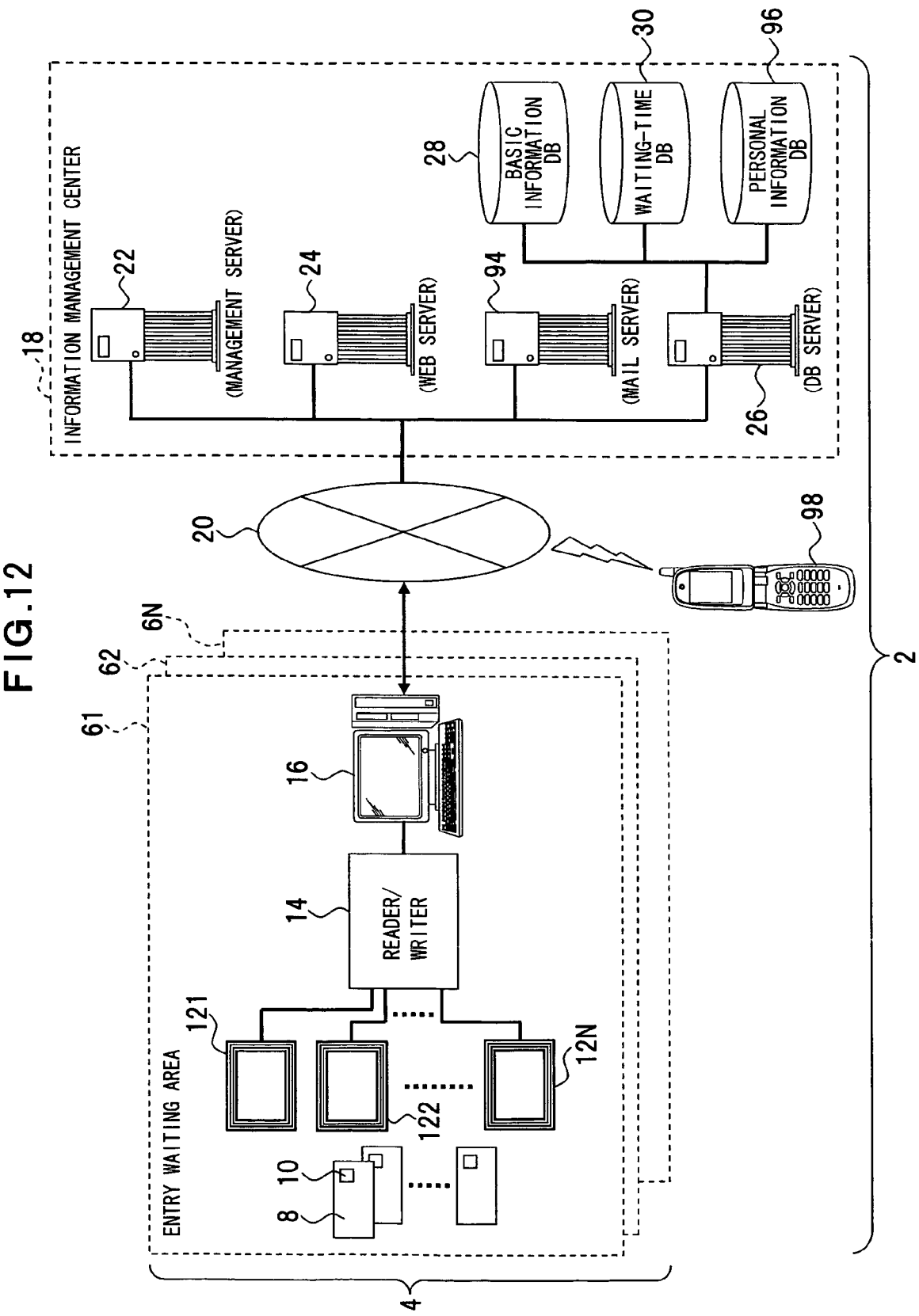
FIG. 12 is a block diagram of a facility usage information processing apparatus according to a second embodiment of the present invention.

A second embodiment of the present invention is described with reference to FIG. 12. FIG. 12 is a block diagram of a facility usage information processing apparatus. In FIG. 12, the same symbols are added to the same portions as FIG. 1.

As is the case of the first embodiment, this facility usage information processing apparatus 2 is disposed in, for example, a facility 4 such as an amusement facility, imports usage information of visitors, i.e. facility users, from the facility 4 in real time and offers various pieces of information such as a waiting time for an attraction to the visitors and others. In an amusement facility, for example, as the facility 4, a plurality of attractions is disposed and the configuration thereof is the same as that of the first embodiment.

When the visitors enter the facility 4, entry tickets 8 are distributed as tickets for using the facility, and each entry ticket 8 is provided with unique information (UID) and is provided with, for example, an IC tag 10 for generating a radio signal which is an electromagnetic wave, as a signal generation unit generating a radio signal having the unique information. By receiving the radio unique information emitted from the IC tag 10, the above mentioned UID can be known from the radio unique information. For the entry ticket 8 (FIG. 2) and the IC tag 10 (FIG. 3), the configurations are the same as the above description. Also, for antennas 121 to 12N and an entry waiting area 61 to 6N in which the antennas 121 to 12N are disposed, the configurations are the same as the above description. Further, the configuration of a reader/writer 14 is the same as the above description.

The reader/writer 14 is controlled by a control PC 16 which acts as a control unit and a calculation unit, and the configuration thereof is the same as the above description. The control PC 16 is connected with an information management center 18 which acts as a calculation unit, information accumulation unit or information notification unit via the network 20 such as the internet, and the detected UIDs are sequentially transmitted and imported to the information management center 18. The configuration (FIG. 6) of the control PC 16 is the same as the above description.

The information management center 18 is provided with a management server 22 which acts as an information processing unit and, as an information notification unit, for example, a web server 24, a DB server 26 and a mail server 94 are provided. The DB server 26 is connected with, for example, a basic information database (DB) 28 which acts as a first information accumulation unit storing various pieces of information such as UID, a waiting time database (DB) 30 which acts as a second information accumulation unit and a personal information DB 96 which acts as a third information accumulation unit. For the management server 22, the web server 24 and the DB server 26, the functionality and the accumulated information are the same as those of the first embodiment. As described above, in the basic information DB 28, the waiting-time management table 91 shown in FIG. 8 is formed for storing predetermined information and, in the waiting-time DB 30, the waiting time table 93 is formed for storing predetermined information. The mail server 94 transmits and receives mail information to and from portable terminal apparatuses 98, for example. The personal information DB 96 stores telephone numbers, mail addresses, unique information such as IDs, UIDs of the IC tags 10 and the like of the portable terminal apparatuses 98.

The portable terminal apparatus 98 is a terminal apparatus which can communicate information using radio transmissions over the network 20, such as a cellular phone, PDA (Personal Digital Assistant) and notebook-size personal computer, for example. Therefore, based on a request via a mail from the portable terminal apparatus 98 registered with the personal information DB 96 by the unique information such as the telephone number or the ID thereof, the portable terminal apparatus 98 is notified of the waiting time stored in the waiting time DB 30 via a mail through the mail server 94.

Figure 13:
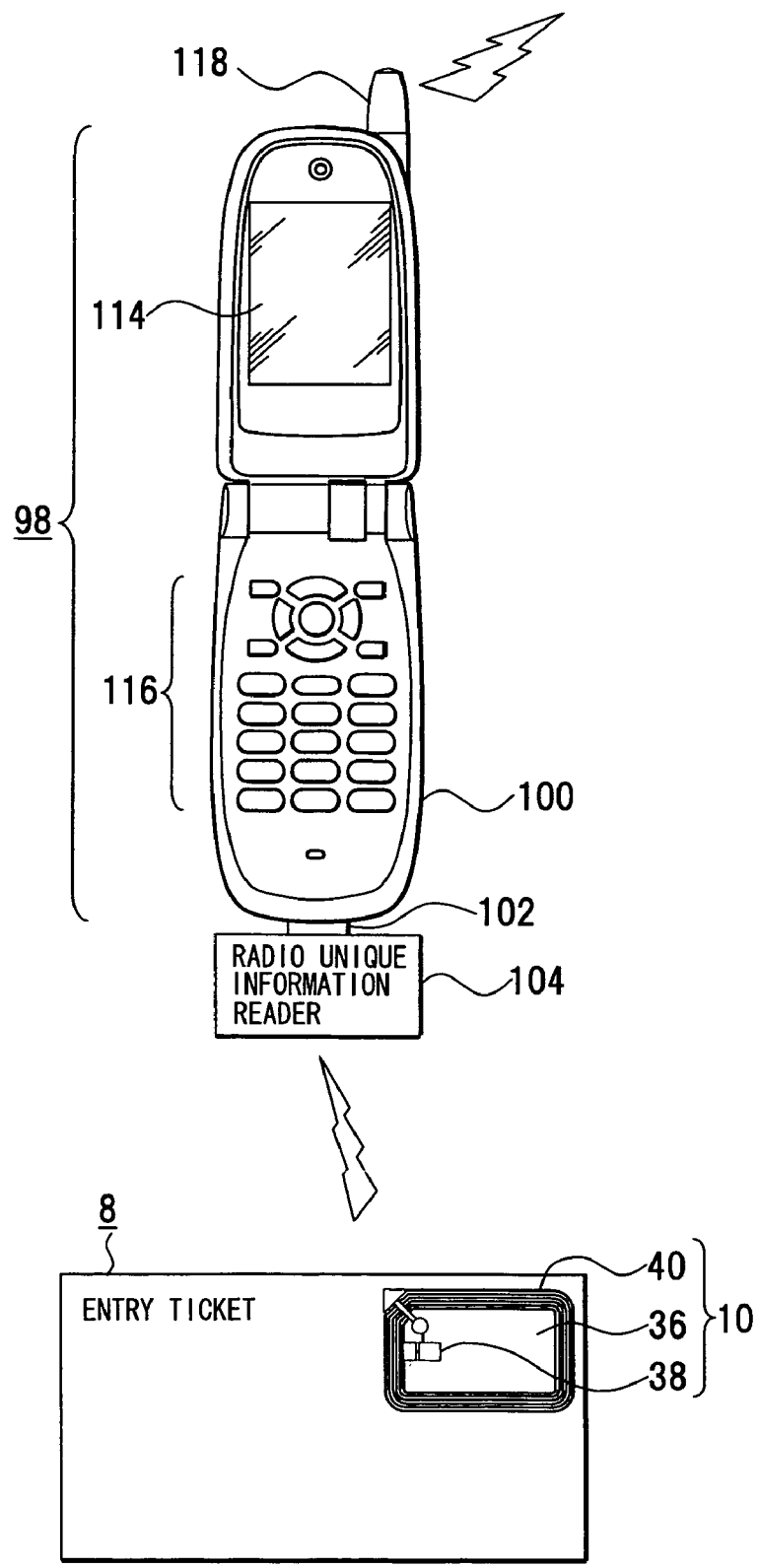
FIG. 13 shows importing and transmitting of IC tag information with the use of a cellular phone apparatus.

Then, for the importing and transmitting of IC tag information with the use of the cellular phone apparatus, description will be made with reference to FIG. 13 and FIG. 14. FIG. 13 shows the importing and transmitting of IC tag information with the use of the cellular phone apparatus, and FIG. 14 shows an example of a configuration of the cellular phone apparatus.

A main unit 100 of the portable terminal apparatus 98 is provided with an external connection port 102 and, as a unique information reception unit for importing the unique information of the entry ticket 8, for example, a radio unique information reader 104 is attached to this external connection port 102. By connecting such a radio unique information reader 104, the portable terminal apparatus 98 can import and transmit the radio unique information emitted from the IC tag 10 of the entry ticket 8 carried by the visitor. The radio unique information is notified to the information management center 18 over the network 20.

Figure 14:
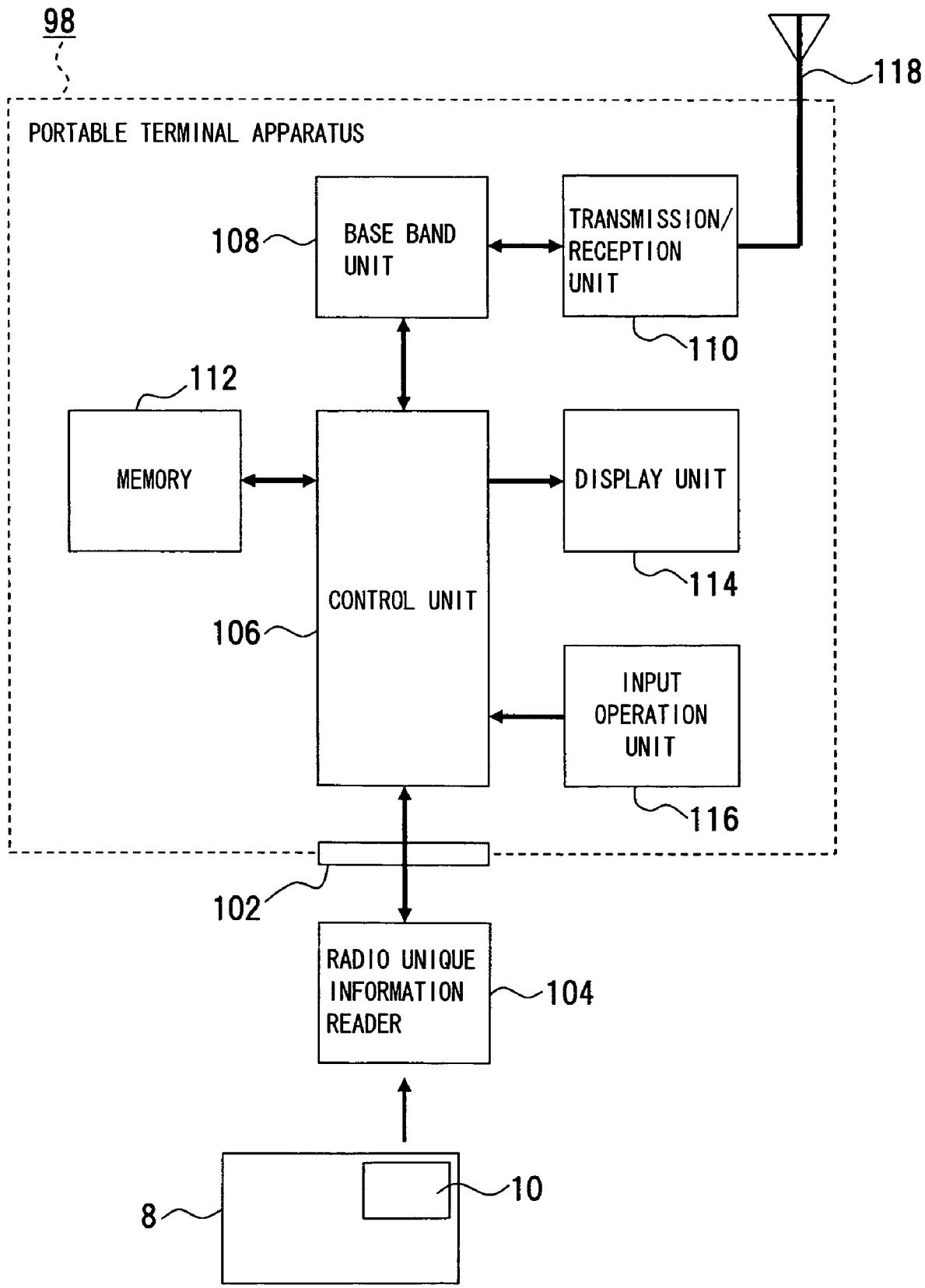
FIG. 14 shows an example of a configuration of a cellular phone apparatus.

The portable terminal apparatus 98 consists of, for example, a cellular phone and is comprised of a control unit 106, a base band unit 108, a transmission/reception unit 110, a memory 112, a display unit 114, an input operation unit 116 and others, as shown in FIG. 14. In such a configuration, the control unit 106 executes control programs stored in the memory 112 to perform various types of processing, such as transmission/reception processing of the radio signals by controlling the base band unit 108 and the transmission/reception unit 110, display control for displaying the information to be presented on the display unit 114, acceptance of a telephone number and the like of a counterpart of the communication from the input operation unit 116, registration processing of the counterpart of the communication or web site addresses to the memory 112, and reception processing of the radio unique information through the radio unique information reader 104 connected to the external connection port 102. The base band unit 108 is used for decoding and encoding signals representing sounds and information. The transmission/reception unit 110 transmits and receives the radio signals through an antenna 118 to perform operations for demodulating audio signals and information signals from the radio signals and transferring the signals to the base band unit 108 and to perform processing for converting signals output from the base band unit 108 to be transmitted into high-frequency signals with modulation processing of carrier signals, and the like. The memory 112 stores the above mentioned control programs and the UIDs extracted from the radio unique information. The display unit 114 consists of, for example, an LCD (Liquid Crystal Display) and is used for displaying the information being processed or the selected information selected by the input operation unit 116. The input operation unit 116 is comprised of various keys such as a power key, cursor keys and character keys, and is used for inputting and selecting information.

As obvious from this configuration, the radio unique information emitted from the IC tag 10 of the entry ticket 8 is imported to the portable terminal apparatus 98, and the UID extracted from the radio unique information is transmitted through the base band unit 108, the transmission/reception unit 110 and the antenna 118 and notified to the information management center 18. Also, along with the UID, the information management center 18 is notified of a mail address and an acceptable waiting time from the portable terminal apparatus 98 for enabling notification of the arrival of the acceptable waiting time to be requested.

Then, for the stored information in the personal information DB 96 registered by visitors and others, description will be made with reference to FIGS. 15(A) and 15(B). FIGS. 15(A) and 15(B) show the stored information of a mail information table and an acceptable waiting-time information table of the personal information DB 96.

In the personal information DB 96, for example, the mail information table 130 shown in FIG. 15 (A) and the acceptable waiting-time information table 132 shown in FIG. 15(B) are formed. The mail information table 310 stores IC tag identification data read out from the IC tags 10 and mail addresses of the portable terminal apparatuses 98 of each visitor 50 carrying the entry ticket 8 to which the IC tag 10 is attached. As described above, these IC tag information data are the UIDs read out by the portable terminal apparatuses 98 with the radio unique information readers 104, and the mail addresses are those that have been given to the portable terminal apparatuses 98. These pieces of information have been transmitted to the information management center 18 by the visitors 50.

The acceptable waiting-time information table 132 stores the IC tag identification data read out from the IC tags 10, the acceptable waiting time and the types of the attractions. In this example, the visitor carrying an entry ticket 8 with IC tag identification data "E04C2280" has been set "60 (minutes)" as the acceptable waiting time for "the roller coaster" and "30 (minutes)" as the acceptable waiting time for "the merry-go-round". As described above, these pieces of information has been transmitted from the portable terminal apparatus 98 to the information management center 18.

Figure 16:
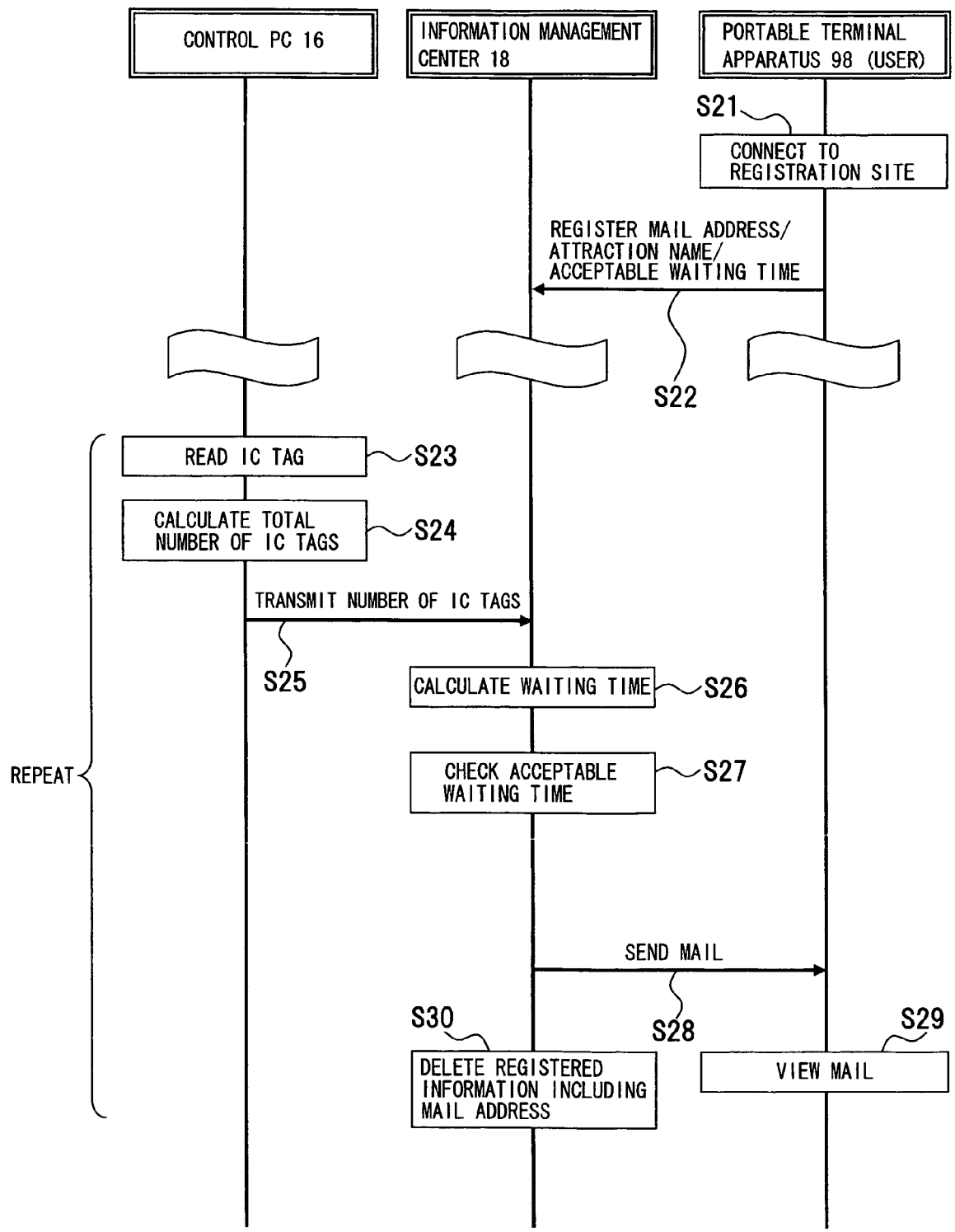
FIG. 16 shows a processing sequence of coordinated processing of a control PC, an information management center and a portable terminal apparatus (user)

Then, for coordinated processing of the control PC, the information management center and the portable terminal apparatus (user), description will be made with reference to FIG. 16. FIG. 16 shows a processing sequence of the coordinated processing of the control PC, the information management center and the portable terminal apparatus (user).

The visitors 50 in the facility connect the portable terminal apparatuses 98 to a registration site on the network 20 (step S21) and register UIDs (IC tag identification data), mail addresses, names of attractions in the facility and acceptable waiting times (step S22). In other words, for the visitors who want to conduct this registration, the UIDs, the mail addresses and the acceptable waiting times are notified to the information management center 18 and registered with the personal information DB 96.

On the control PC 16 side, processing is repeatedly executed for reading the IC tags 10 of the entry tickets 8 through the reader/writer 14 (step S23), for calculating the total number of the IC tags 10 (step S24) and for transmitting the number of the IC tags 10 to the information management center 18 (step S25). These processing (step S23, step S24 and step S25) are triggered and executed by the entry check events generated at certain time intervals.

When receiving the transmission of the number of the IC tags 10, the information management center 18 calculates the waiting time Tw for each attraction (step S26) and performs a check for the registered acceptable waiting time (step S27). In this check for the registered acceptable waiting time, the acceptable waiting time registered from the portable terminal apparatuses 98 is compared with the waiting time Tw of each attraction, and the attractions with approximate values are searched for. Results of the retrieval are notified to the portable terminal apparatuses 98 through the mail transmission (step S28). On the portable terminal apparatuses 98 receiving this mail transmission, the attractions conforming to the acceptable waiting time can be known by viewing the mail (step S29). After sending the mail, triggered by the mail transmission, the duty of notification disappears in the information management center 18, and the registration information including the mail address is deleted (step S30). This registration information includes the above mentioned mail address as well as the UID, the attraction names specified by the user and the like. Subsequently, the processing from step S23 to step S30 is executed repeatedly.

Figure 17:
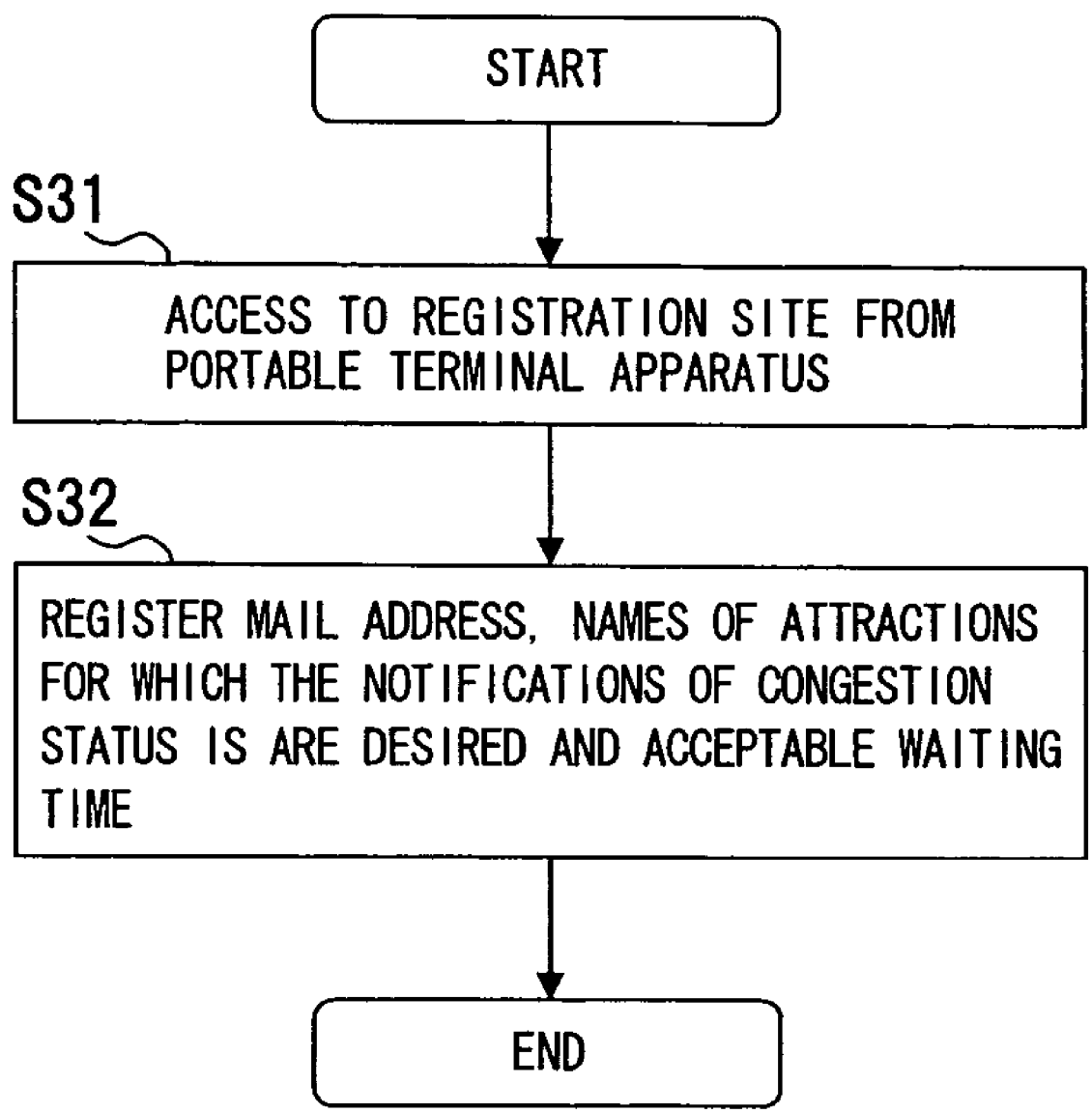
FIG. 17 is a flowchart showing a processing procedure of registration processing of a portable terminal apparatus.

Then, the registration processing of the portable terminal apparatus (user) is described with reference to FIG. 17. FIG. 17 is a flowchart showing a processing procedure of the registration processing of the portable terminal apparatus.

If the visitor 50, i.e., a facility user carries the portable terminal apparatus 98 such as a cellular phone, the visitor 50 accesses the registration site from the portable terminal apparatus 98 (step S31) and registers a mail address of the portable terminal apparatus 98, names of the attractions for which the notifications of congestion status are desired, the acceptable waiting times thereof and the like to the detected registration site. This registered information is registered and managed in the personal information DB 96 (FIG. 12) and the like of the information management center 18.

Figure 18:
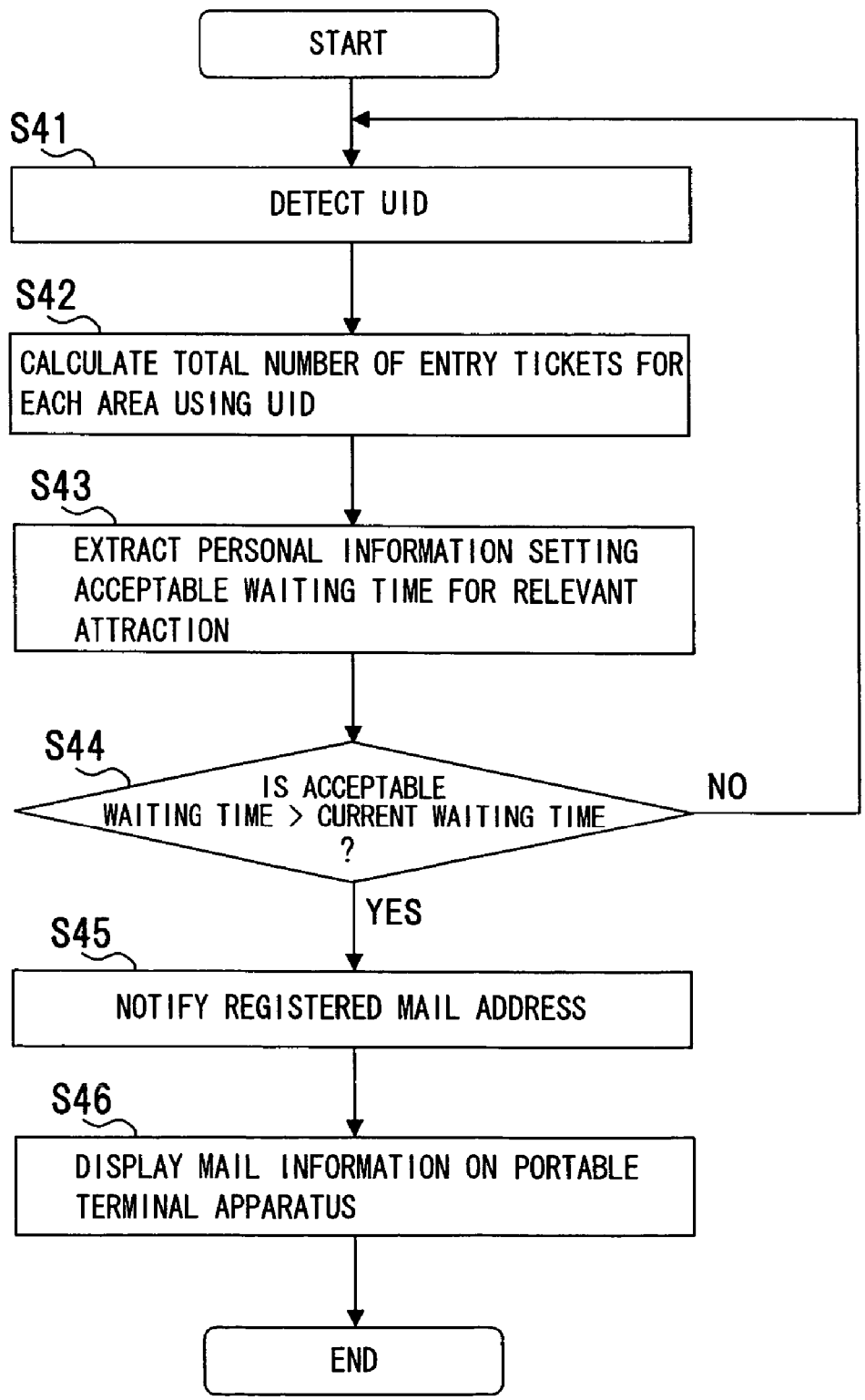
FIG. 18 is a flowchart showing a processing procedure of information processing in a control PC and an information management center.

Then, the information processing in the information management center is described with reference to FIG. 18. FIG.

18 is a flowchart showing a processing procedure of the information processing in the control PC and the information management center.

The radio unique signal emitted from the IC tag 10 is detected by the reader/writer 14 and the UID is extracted. The UID is notified to the information management center 18 from the control PC 16. In the information management center 18, the number of the UIDs, i.e., the number of the tags are counted (step S41). In this case, the number of the tags may be counted in the control PC 16 and the counted number may be transferred to the information management center 18.

The management server 22 uses the imported UIDs to calculate the total number Nm of the entry tickets 8 and the total number Na of the entry tickets 8 for each entry waiting area 61 to 6N, and the waiting time Tw for each attraction is calculated from the above mentioned equation (1) using the total number Na of the entry tickets for each area 61 to 6N, the entry unit waiting time tw for each area 61 to 6N and the entry unit n which is the number of people who can enter the attraction in each area 61 to 6N at one time (step S42).

Corresponding to this waiting time Tw, the personal information setting the acceptable waiting time for the relevant attraction is extracted from the personal information DB 96 (step S43); the acceptable waiting time Tad is compared with the current waiting time Tw of the attraction (step S44); if the current waiting time Tw is longer than the acceptable waiting time Tad (Tad<Tw), the procedure returns to step S41; and if the current waiting time Tw is equal to or shorter than the acceptable waiting time Tad (Tad≧Tw), this is notified to the registered mail address (step S45). As the result of this notification, the mail information is displayed on the display unit 114 (FIG. 13) of the portable terminal apparatus 98, and it can be known from the display that, for the attraction wished to utilize, the waiting time is shifted to the acceptable waiting time.

Figure 19:
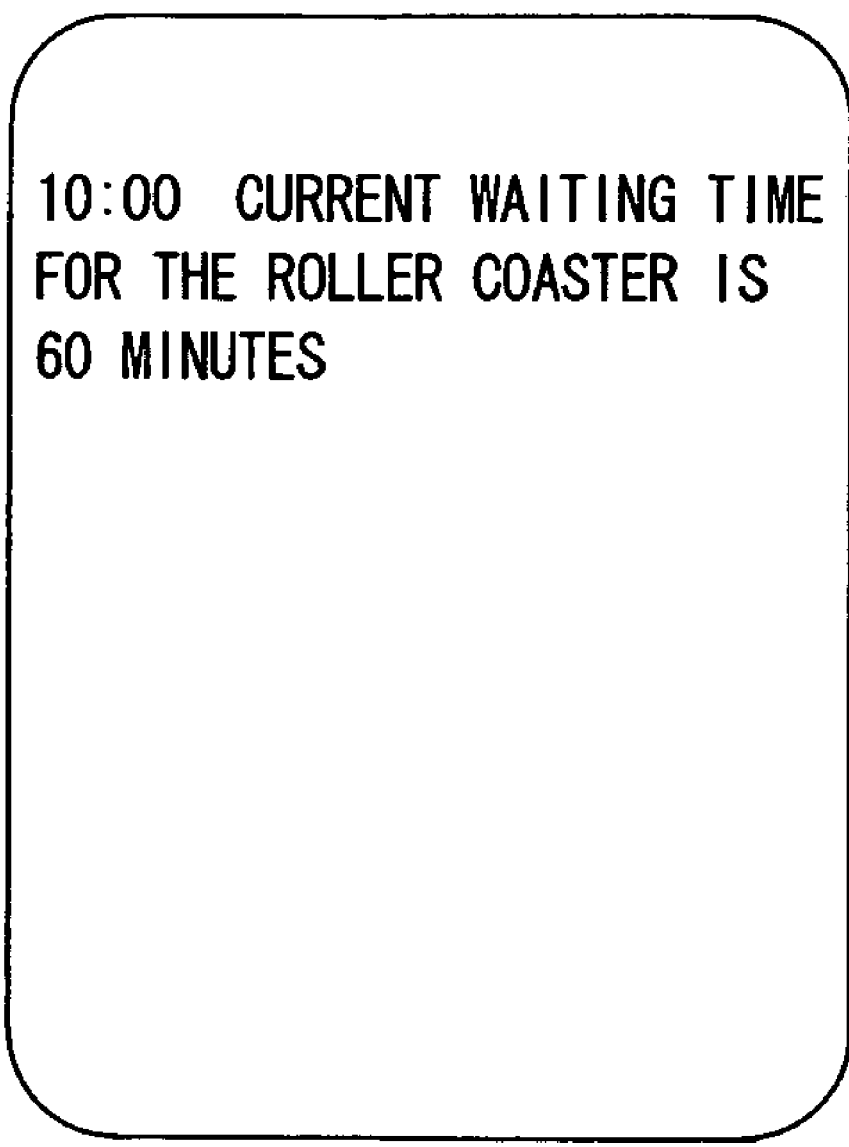
FIG. 19 is a display screen on a display unit of a portable terminal apparatus.

On the display unit 114 of the portable terminal apparatus 98, for example, a display screen 134 shown in FIG. 19 is displayed, which is "10:00 current waiting time for the roller coaster is 60 minutes" in this case. As described above, this waiting time of 60 minutes is identical to the registered time (60 minutes) in the acceptable waiting time information table 132.

Figure 20:
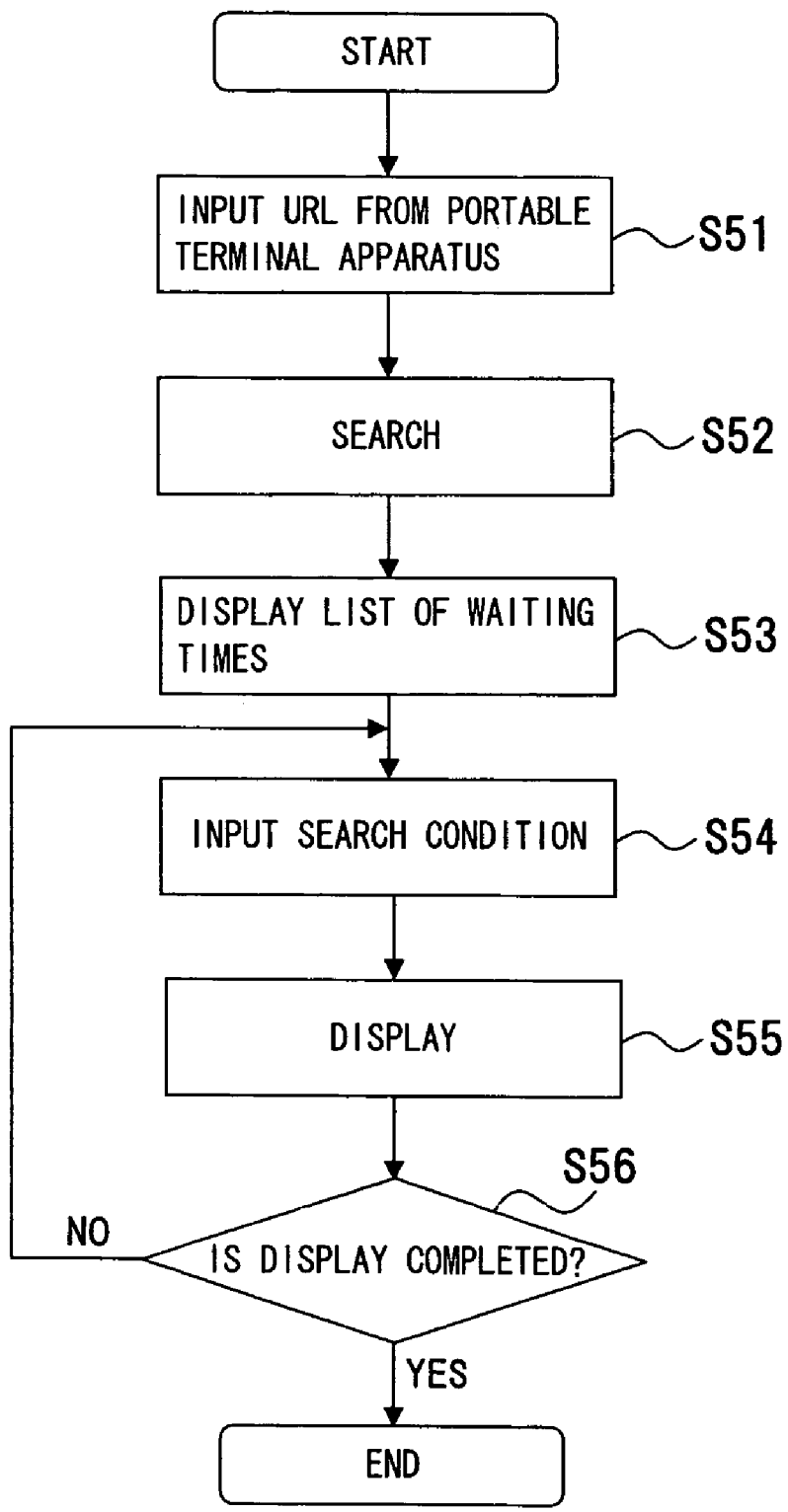
FIG. 20 is a flowchart showing a processing procedure of information retrieval processing by a portable terminal apparatus.

Then, for the retrieval of the waiting-time information through the portable terminal apparatus, description will be made with reference to FIG. 20. FIG. 20 is a flowchart showing a processing procedure of information retrieval processing through the portable terminal apparatus.

If the waiting-time information for each attraction in the facility is published on a web site, the information on the web site can be checked from the portable terminal apparatus 98. In this case, by inputting a web site address (URL) to the portable terminal apparatus 98 (step S51), the web page established on the web server 24 is searched for via the network 20 (FIG. 12) (step S52). As the result of this retrieval, a list is displayed for the current waiting time of each attraction (step S53), and a search condition is input from the portable terminal apparatus 98 (step S54). If, for example, the waiting time is input as this search condition, the attractions within that waiting time are displayed along with the waiting times (step S55). By pressing an end key of the input operation unit 116, the display is canceled and then, by inputting a new search condition, the display conforming to the search result can be obtained (step S56).

The list display of the waiting times in step S53 is displayed on, for example, a display screen 136 as shown in FIG. 21(A), and this display screen 136 shows "Waiting Time List" as a title display, "As of 10:00" as a display of a current time and "Roller Coaster 80 minutes", "Coffee Cup 20 minutes", "Haunted House 30 minutes", "Ferris Wheel 45 minutes" and the like as the attraction names and the waiting times, as well as shows "refinement condition", "☐waiting time within 30 minutes", "☐within OO m from present location", "☐ grade-schoolers and younger children can ride" and "☐free keyword" as search conditions, and "Search" is displayed as an item which can be selected by a cursor 138. By this display, names and waiting times of the attractions can be known and, by ticking square fields of the search conditions in step S54 and by moving the cursor on the Search and operating an execution key, search processing is executed depending on the search conditions. In this case, since keywords such as attraction name and the like are registered in the waiting-time DB 30, if "free keyword" is selected and if a match is obtained between the keywords, relevant attractions and waiting times can be extracted.

On the display screen shown in FIG. 21(A), the cursor is positioned at "waiting time within 30 minutes" as the search condition and, as a result of selecting that item, the display screen 136 shown in FIG. 21(B) shows "waiting time within 30 minutes" as the item of the search condition as well as the names and waiting times of the attractions such as, for example, "Coffee Cup 20 minutes" and "Haunted House 30 minutes" as a result of the search. From these searches and displays, desired attractions can be selected and the waiting times can be known.

Then, technical matters are extracted from the above mentioned embodiments of the facility usage information processing apparatus, method for information processing thereof and portable terminal apparatus, and technical meanings, variants and other technical expansions are listed bellow.

(1) Although, in above embodiments, the terminal apparatus is exemplified by the portable terminal apparatus 98, terminal apparatuses such as notebook PCs or Personal digital Assistants (PDAs) may be used.

(2) Although, in above embodiments, the control PC 16 and the information management center 18 are separately constructed as the calculation unit, an integrated configuration may be employed.

(3) Although, in above embodiments, the unique information of the entry ticket 8 consists of the radio unique information of the IC tag 10, the unique information may consist of information other than a radio signal.

(4) There is provided a facility usage information processing apparatus, comprising a detection unit detecting unique information of tickets carried by visitors in an area for keeping the visitors waiting; a calculation unit calculating visitor information representative of a congestion status of the visitors in the area with the use of the detected information of the detection unit; an information accumulation unit registering acceptable values for the visitor information as well as registering contact addresses of terminal apparatuses; and an information notification unit, if the visitor information becomes equal to or less than the acceptable value, notifying the terminal apparatus with the registered contact address of the information representative thereof.

According to this configuration, the unique information is detected by the detection unit from the tickets of the visitors in the waiting area for the visitors and the detected information is imported to the calculation unit to calculate the visitor information representing the congestion status within the area. The information accumulation unit has been registered with the acceptable value for the visitor information representing the congestion status and the contact address of the terminal apparatus. Therefore, when the visitor information becomes equal to or lower than the acceptable value, the information notification unit notifies the terminal apparatus with the contact address of that. As a result, from the terminal apparatus, the visitors in any area can find the visitor information equal to or lower than the acceptable value.

(5) There is provided a facility usage information processing apparatus comprising a signal transmission unit that is disposed on a ticket carried by visitors in an area for keeping the visitors waiting, the signal transmission unit issuing a radio signal representative of unique information of the ticket; a plurality of antennas partitioning the area by reception ranges of the radio signals and receiving the radio signals within the partitions; a unique information detection unit detecting unique information from the radio signals received by the antennas; and a calculation unit calculating the number of people and waiting time information in the area along with area information representative of the area, by using the detected information of the unique information detection unit and the position information of the antennas.

According to this configuration, the radio signals representing the unique information are transmitted from the signal transmission units of the tickets carried by the visitors in the waiting area for the visitors. In order to receive this radio signals, if the area is partitioned by the reception range of the radio signals and if a plurality of antennas are disposed for receiving the radio signals within the partition, the tickets can be detected for the visitors waiting within the reception range of each antenna. Therefore, by using the detected information and position information of the antennas, the number of the visitors or the waiting time information can be calculated for each area.

(6) There is provided a facility usage information processing apparatus, comprising a first information processing device disposed in a facility; and a second information processing device connected with the first information processing device via network, the second information processing device being disposed in a management center of the facility, wherein the first information processing device is configured to import detected information of visitors waiting in an area set up within the facility and transmit the detected information to the second information processing device via the network, and wherein the second information processing device is configured to accumulate the detected information transmitted from the first information processing device and notify of visitor information representative of the transition of the visitors in the area.

According to this configuration, the first and second information processing devices are disposed via the network, and the detected information of the visitors in the area is imported on the side of the first information processing device and is transmitted to the second information processing device over the network. The second information processing device can store the detected information, calculate the visitor information representing the transition of the visitors in the area and notify the visitors of the visitor information over the network.

(7) There is provided an information processing method of a facility usage information processing apparatus, the method comprising the steps of detecting at predetermined time intervals unique information of tickets carried by visitors in an area for keeping the visitors waiting; calculating visitor information representative of a congestion status of the visitors in the area with the use of the detected unique information; and displaying the visitor information.

According to this configuration, the unique information is detected at predetermined time intervals from the tickets carried by the visitors in the waiting area of the visitors of the facility, and the visitor information is calculated for the number of the visitors and the waiting time, based on the detected information. Since the visitor information as the calculation result is displayed, the visitors can tell the congestion status of the visitors from the display.

(8) There is provided an information processing method of a facility usage information processing apparatus, the method comprising detecting unique information of tickets carried by visitors in an area for keeping the visitors waiting; calculating visitor information representative-of a congestion status of the visitors in the area with the use of the detected unique information; registering acceptable values for the visitor information as well as registering contact addresses of terminal apparatuses; and if the visitor information becomes equal to or less than the acceptable value, notifying the terminal apparatus with the registered contact address of the information representative thereof.

According to this configuration, the unique information is detected from the tickets carried by the visitors in the waiting area of the visitors, and the visitor information representing the congestion status is calculated based on the detected information. Also, by registering the acceptable value for the visitor information representing the congestion status and the terminal apparatus with the contact address, if the visitor information becomes equal to or lower than the acceptable value, the terminal apparatus with the contact address is notified of that. In this way, the visitors can tell the congestion status with the use of the terminal apparatus.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

The entire disclosure of Japanese Patent Application No. 2004-381893 including specification, claims, drawings and summary are incorporated herein by reference in its entirety.

What is claimed is:

1. A facility usage information processing apparatus used to monitor a status of at least one of a plurality of areas monitored by the facility usage information processing apparatus, the facility usage information processing apparatus comprising:

a detection unit to detect unique information of tickets for each area, the tickets being carried by visitors in an area of the plurality of areas;

a calculation unit to calculate visitors information representative of a congestion status of the visitors in each of the areas with the use of the detected information of the detection unit;

an information storing unit to register acceptable values for the visitors information as well as contact addresses of portable terminal apparatuses; and an information notification unit to notify, when the visitors information becomes equal to or less than the acceptable value for at least one of the plurality of areas, the portable terminal apparatuses with the registered contact addresses of the visitors information representative of the congestion status.

2. The facility usage information processing apparatus of claim 1, wherein the information notification unit is configured to publish the visitors information on a web site on network for enabling the portable terminal apparatuses to extract the visitors information from the web site.

3. The facility usage information processing apparatus of claim 1, wherein the calculation unit generates an entry check events at time intervals, and in response to this entry check event, the detection unit detects the unique information.

4. The facility usage information processing apparatus of claim 3, wherein the information notification unit notifies the portable terminal apparatuses of information corresponding to generation of the entry check events.

5. The facility usage information processing apparatuses according to claim 1, wherein each of the portable terminal apparatuses comprise:
- a display unit to display information received from the information notification unit.

6. An information processing method of a facility usage information processing apparatus used to monitor a status of at least one of a plurality of areas, the method comprising:
- detecting, with a detecting unit, unique information of tickets for each area, the tickets being carried by visitors in an area of the plurality of areas;
- calculating, with a calculating unit, visitors information representative of a congestion status of the visitors in each of the plurality of areas with the use of the detected unique information;
- registering, in a storage unit, acceptable values for the visitors information as well as registering contact addresses of portable terminal apparatuses; and
- notifying, when the visitors information becomes equal to or less than the acceptable value for at least one of the plurality of areas, the portable terminal apparatuses with the registered contact addresses of the visitors information representative of the congestion status.

7. A facility usage information management system, comprising:
- a portable terminal apparatus;
- a plurality of tickets for each area, the tickets being carried by visitors in an area of the plurality of areas and each of the tickets having unique information;
- a facility usage information processing apparatus used to monitor a status of at least one of a plurality of areas monitored by the facility usage information processing apparatus, the facility usage information processing apparatus including:
- a detection unit to detect the unique information of the tickets for each area;
- a calculation unit to calculate visitors information representative of a congestion status of the visitors in each of the areas with the use of the detected information of the detection unit;
- an information storing unit to register acceptable values for the visitors information as well as a contact address for the portable terminal apparatus; and
- an information notification unit to notify, when the visitors information becomes equal to or less than the acceptable value for at least one of the plurality of areas, the portable terminal apparatus with the registered contact address of the visitors information representative of the congestion status, the portable terminal apparatus including
- a display unit to display the visitors information notified from the facility usage information processing apparatus.

* * * * *

UNITED STATES PATENT AND TRADEMARK OFFICE
CERTIFICATE OF CORRECTION

PATENT NO. : 7,634,418 B2  Page 1 of 1
APPLICATION NO. : 11/088925
DATED : December 15, 2009
INVENTOR(S) : Mitsugu Kato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Ninth Day of November, 2010

David J. Kappos
*Director of the United States Patent and Trademark Office*